(12) United States Patent
Urey

(10) Patent No.: US 7,133,204 B2
(45) Date of Patent: *Nov. 7, 2006

(54) APPARATUS AND METHODS FOR GENERATING MULTIPLE EXIT-PUPIL IMAGES IN AN EXPANDED EXIT PUPIL

(75) Inventor: Hakan Urey, Redmond, WA (US)

(73) Assignee: Microvision, Inc., Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/890,501

(22) Filed: Jul. 12, 2004

(65) Prior Publication Data

US 2004/0252377 A1   Dec. 16, 2004

(51) Int. Cl.
*G02B 27/44* (2006.01)
*G02B 5/18* (2006.01)
(52) U.S. Cl. ......................... 359/566; 359/563
(58) Field of Classification Search ........ 359/566–576, 359/563
See application file for complete search history.

(56) References Cited

U.S. PATENT DOCUMENTS

| 5,029,243 | A | * | 7/1991 | Dammann et al. ..... 219/121.77 |
| 5,113,286 | A | * | 5/1992 | Morrison ..................... 359/569 |
| 5,513,025 | A | * | 4/1996 | Watanabe et al. ........... 349/106 |

* cited by examiner

*Primary Examiner*—Leonidas Boutsikaris
(74) *Attorney, Agent, or Firm*—Christopher A. Wiklof; Graybeal Jackson Haley LLP

(57) ABSTRACT

A diffraction grating generates even-order, odd-order, and $0^{th}$-order exit-pupil images. The even-order exit-pupil images have brightness levels within a first range and the odd-order exit-pupil images have brightness levels within a second range that is different from the first range. In one example, the even-order exit-pupil images are virtually invisible, i.e., missing, the odd-order exit-pupil images have the same or approximately the same intensities, and the $0^{th}$-order exit-pupil image has an intensity greater than the respective intensities of the odd-order exit-pupil images.

23 Claims, 17 Drawing Sheets

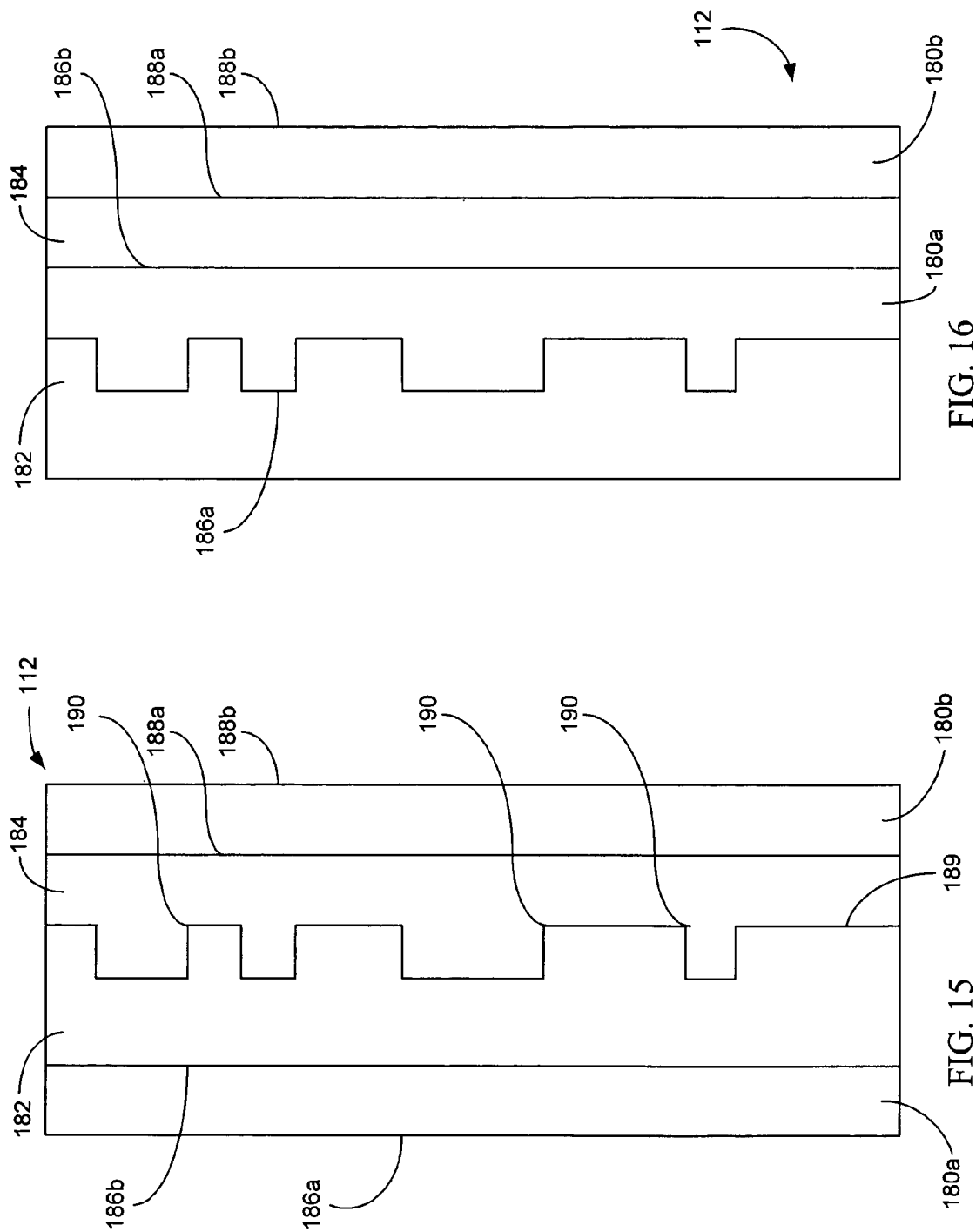

APPARATUS AND METHODS FOR GENERATING MULTIPLE EXIT-PUPIL IMAGES IN AN EXPANDED EXIT PUPIL

PRIORITY CLAIM

The present application claims priority from commonly owned U.S. patent application Ser. No. 10/205,858, filed Jul. 26, 2002 and U.S. patent application Ser. No. 10/206,177, filed Jul. 26, 2002, both of which claim priority to commonly owned U.S. provisional patent application Ser. No. 60/350,089, filed Nov. 2, 2001, the benefit of the file date of which is hereby claimed under 35 USC 120. All of these referenced applications are incorporated herein by reference.

RELATED APPLICATIONS

This application is related to commonly owned U.S. patent application Ser. No. 10/889,963, titled "BEAM MULTIPLIER THAT CAN BE USED AS AN EXIT-PUPIL EXPANDER AND RELATED SYSTEM AND METHOD", which is incorporated by reference and was filed on the same day as this application.

FIELD OF THE INVENTION

The invention relates generally to image display/projection systems, and more particularly to an apparatus such as a virtual retinal display that generates an array of exit-pupil images of uniform brightness.

BACKGROUND OF THE INVENTION

A variety of image-display/image-projection devices and techniques are available for displaying/projecting graphical or video images—often called video frames—to a viewer. A graphical image, i.e., a graphic, typically changes infrequently or not at all. For example, a flight-instrument graphic of cockpit instruments may overlay a pilot's view. This graphic may be projected onto a viewing area such as the windshield, or may be projected directly into the pilot's eyes such that he/she sees the flight instruments regardless of his/her viewing direction. Typically, there is little change in this graphic other than the movement of the instrument pointers or numbers. Conversely, video frames are a series of images that typically change frequently to show movement of an object or the panning of a scene. For example, a television displays video frames.

A cathode-ray-tube (CRT) display, such as used in a television or computer monitor, is a common image-display/image-projection device that, unfortunately, has several limitations. For example, a CRT is typically bulky and consumes a significant amount of power, thus making it undesirable for many portable or head-mounted applications.

Flat-panel displays, such as liquid-crystal displays (LCDs), organic LEDs, plasma displays, and field-emission displays (FEDs), are typically less bulky and consume significantly less power than a CRT having a comparable viewing area. But flat panel displays often lack sufficient luminance and adequate color purity or resolution for many head-mounted applications.

Referring to FIG. 1, although a scanned-beam display system 71 often overcomes the limitations of the above-described displays, the viewer may lose sight of the displayed image if he/she moves his/her eye 73. The display system 71 includes a scanning source 72, which outputs a scanned beam of light that is coupled to a viewer's eye 73 by a beam combiner 74. In one embodiment, the scanning source 72 includes a scanner (not shown), such as a scanning mirror or acousto-optic scanner, that scans a modulated light beam through a viewer's pupil 75 and onto a viewer's retina 76. In another embodiment, the scanning source 72 may include one or more light emitters (not shown) that are rotated through an angular sweep. Because such displays scan or project an image through the pupil of the viewer's eye, the display's "exit pupil"—defined as an area, often a plane, in front of the viewer's eye 73 where the image is located—is limited to the diameter of the viewer's pupil 75, which typically ranges from about 2 millimeters (mm) in bright light to about 7 mm in dim light. Consequently, the viewer may "lose" the image when he/she moves his/her eye 73. A display system similar to the display system 71 is further described in U.S. Pat. No. 5,467,104, which is incorporated by reference.

Referring to FIG. 2, a scanned-beam display system 82 overcomes the problem of "losing" an image due to eye movement by including a diffraction grating 84 to generate an exit pupil 86, which includes an array of multiple exit-pupil images 88. Specifically, a modulated light beam 92 scans an image 93 onto the diffraction grating 84, where the size of the image is determined by a scanning angle $2\theta$. The grating 84 diffracts the beam 92 into fractional beams 98a–98c, which respectively generate exit-pupil images 88a–88c as the beam 92 scans the image 93. Each of the images 88a–88c is a replica of, but has a lower intensity than, the image 93. An eyepiece 95 collimates the images 88a–88c to form the exit pupil 86. When the viewer's pupil 75 is aligned with one or more of the images 88a–88c, the aligned image or images 88 converge on an area 100 of the viewer's retina 76 to replicate the image 93. The intensity of the replicated image is proportional to the number of images 88 that converge to form the replicated image on the retinal area 100.

By including multiple exit-pupil images 88, the exit pupil 86 effectively increases the viewer's field of view with respect to the image 93. That is, as long as at least one of the exit-pupil images 88a–88c is within the viewer's field of view, he/she can see the image 93. For example, if the viewer looks down slightly, the exit-pupil image 88b moves out of his/her view, but the image 88a remains in view and the image 88c enters his/her view. Therefore, even though the viewer has moved his/her eye 73, he/she still views the image 93 via the exit-pupil images 88a and 88c. A scanned-beam display system that is similar to the display system 82 is further described in U.S. Pat. No. 5,701,132, which is incorporated by reference.

Unfortunately, the exit-pupil images 88 generated by the scanned-beam display 82 often have non-uniform intensities, which may annoy or distract the viewer. Specifically, the diffraction grating 84 is typically designed for a single wavelength of light, but the image beam 92 typically includes other wavelengths in addition to this single wavelength. These other wavelengths often cause the exit-pupil images 88 to have different intensities. Therefore, one typically limits the intensity of the beam 92 so that the brighter exit-pupil images 88 are not too bright for the viewer. But this may cause some of the dimmer images 88 to be too dim for the viewer to see, thus causing "holes" in the exit pupil 86. Furthermore, even if none of the images 88 are too dim for the viewer to see, the differences in intensity among the images 88 may annoy or distract the viewer as he/she shifts his/her gaze.

SUMMARY OF THE INVENTION

In one aspect of the invention, a diffraction grating generates even-order, odd-order, and $0^{th}$-order exit-pupil images from an image. The even-order exit-pupil images having brightness levels within a first range and the odd-order exit-pupil images having brightness levels within a second range that is different from the first range. In one example, the even-order exit-pupil images are virtually invisible, i.e., missing, the odd-order exit-pupil images have the same or approximately the same intensities, and the $0^{th}$-order exit-pupil image has an intensity greater than the respective intensities of the odd-order exit-pupil images. In this and other examples, the relative intensities of the even-, odd- and $0^{th}$-order exit-pupil images are independent of the wavelength(s) ($\lambda$) of light that generate the exit-pupil images.

BRIEF DESCRIPTION OF THE DRAWINGS

FIG. 15 is a cross-sectional view of an on/off diffraction grating that can be used in the lens assemblies of FIGS. 4, 6, and 8 according to an embodiment of the invention.

FIG. 16 is a cross-sectional view of an on/off diffraction grating that can be used in the lens assemblies of FIGS. 4, 6, and 8 according to another embodiment of the invention.

DESCRIPTION OF THE INVENTION

Figure 1:
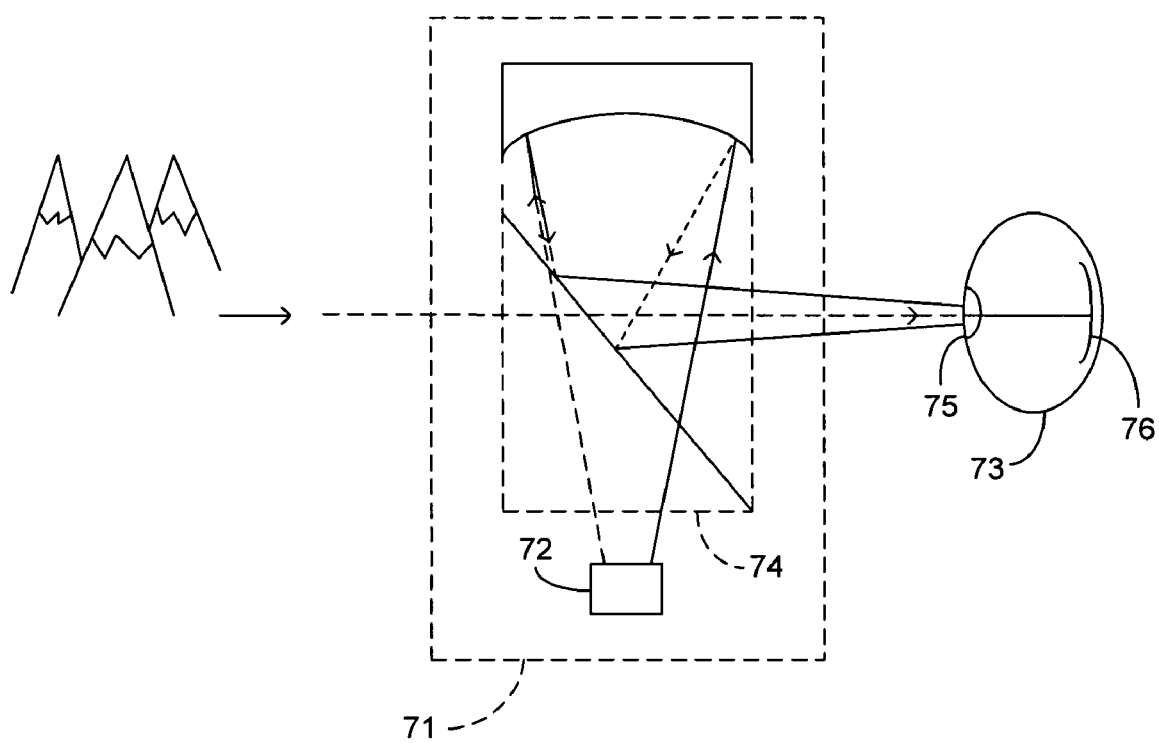
FIG. 1 is a diagram of a conventional scanned-beam display system.
Figure 2:
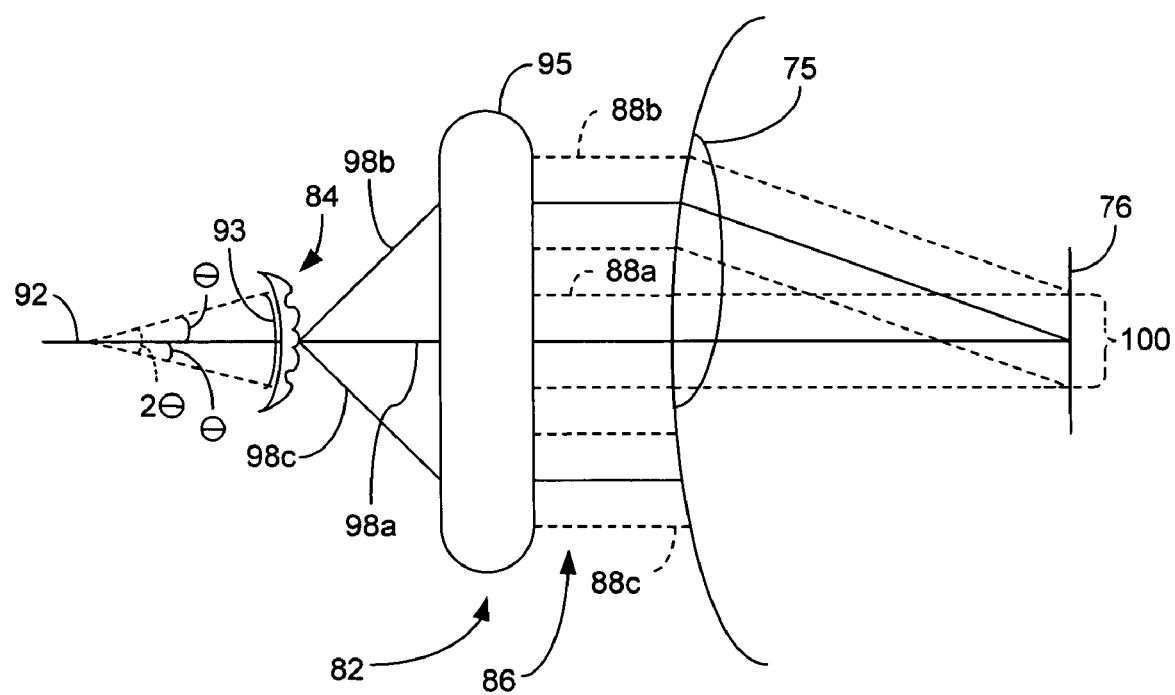
FIG. 2 is a diagram of a conventional scanned-beam display system that includes an exit-pupil expander.
Figure 3:
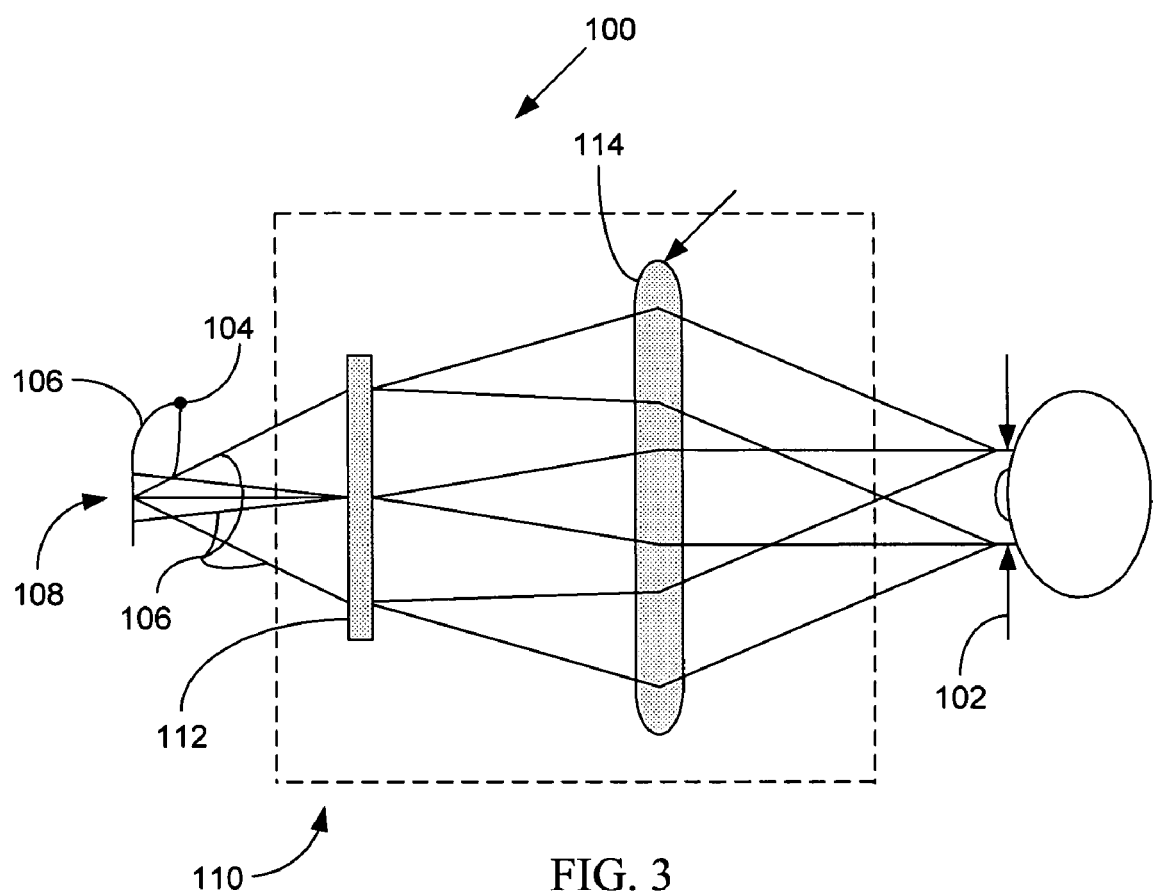
FIG. 3 is a diagram of a scanned-beam display system according to an embodiment of the invention.

FIG. 3 is a diagram of a scanned-beam display system 100 that generates an exit pupil 102 having exit-pupil images (not shown in FIG. 3) of uniform or approximately uniform intensity according to an embodiment of the invention. The display system 100 includes an image-beam source 104 for generating an image beam 106, a scanning assembly 108 for scanning the beam 106, and a lens assembly 110. The assembly 110 includes a diffraction grating 112 for generating exit-pupil images having different intensities, and includes an ocular 114 for filtering the exit-pupil images from the grating 112 to generate the exit pupil 102. The lens assembly 110 is further discussed below in conjunction with FIGS. 4–14.

In operation of the display system 100, the source 104 modulates the beam 106 to generate pixels of a scanned image (not shown in FIG. 3), and the scanning assembly 108 scans the modulated beam 106 onto the diffraction grating 112. Although multiple paths of the scanned beam 106 are shown to illustrate the generation of the exit pupil 102, it is understood that the beam travels along only one path at a time. The grating 112 diffracts the beam 106, and thus generates an array of exit-pupil images (not shown in FIG. 3) having a center image that is brighter than the visible peripheral images, which have the same or approximately the same intensity. The ocular 114 collects this array of exit-pupil images, and, at an intermediate exit-pupil plane (not shown in FIG. 3) within the ocular, partially attenuates the center exit-pupil image or fully attenuates, i.e., blocks, the center exit-pupil image. By partially or fully attenuating the center exit-pupil image, the ocular 114 generates each of the exit-pupil images of the exit pupil 102 having the same or approximately the same intensity as the other exit-pupil images. A beam source such as the source 104 and a scanning assembly such as the assembly 108 are discussed in commonly owned U.S. patent application Ser. No. 09/369,676, titled SCANNED DISPLAY WITH SWITCHED FEEDS AND DISTORTION CORRECTION, which is incorporated by reference.

Still referring to FIG. 3, although the lens assembly 110 is described as generating the exit pupil 102 from a scanned beam 106, the assembly 110 can also generate the exit pupil 102 from an image that is projected onto the diffracting grating 112. For example, the image-beam source 104 and the scanning assembly 108 may be replaced with a planar image display (not shown) such as an light-emitting-diode (LED) matrix display, a liquid-crystal (LC) matrix display, or a cathode-ray-tube (CRT) display. Such planar displays and the optical components (not shown) that would be disposed between such a display and the grating 112 are known; consequently, discussion of such displays and components is omitted for brevity.

Furthermore, although described as producing a center image that is brighter than each of the uniformly bright peripheral images, the diffracting grating 112 may generate an array of exit-pupil images having a different intensity pattern. With such a grating 112, the ocular 114 can filter exit-pupil images other than the center image.

Figure 4:
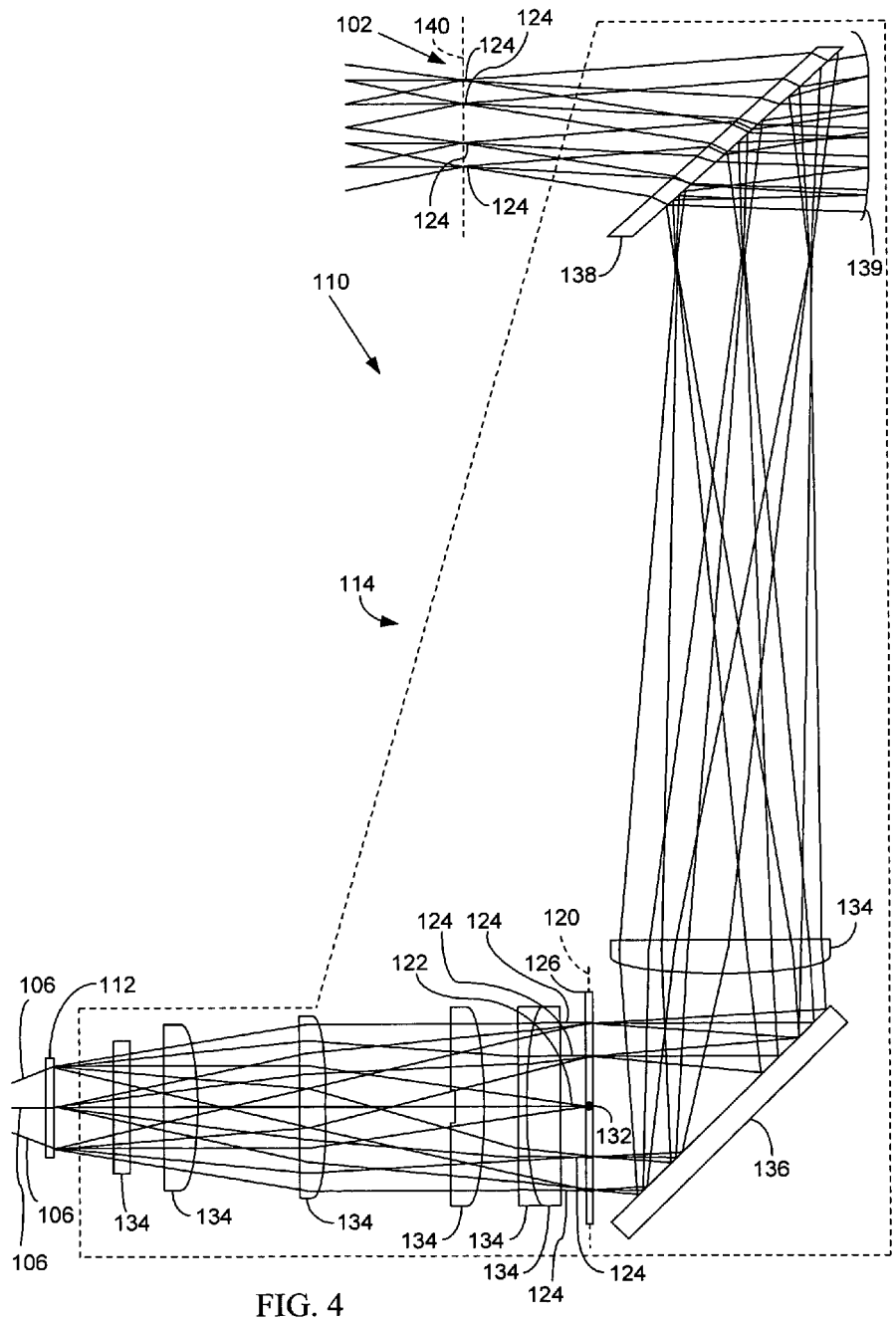
FIG. 4 is a diagram of the lens assembly of FIG. 3 according to an embodiment of the invention.

FIG. 4 is a diagram of the lens assembly 110 of FIG. 3 according to an embodiment of the invention where the viewer's eye (FIG. 3) is on the same side of the assembly 110 as the scanning assembly 108 (FIG. 3). The diffracting grating 112 generates an array of exit-pupil images in an intermediate exit-pupil plane 120, where a center exit-pupil image 122 has a first intensity and the peripheral exit-pupil images 124 each have or approximately have a second intensity that is less than the first intensity. The ocular 114 includes an obscuration plate 126, which blocks the center exit-pupil image 122 such that the peripheral exit-pupil images 124 of the exit pupil 102 each have the same or approximately the same intensity.

Figure 5A:
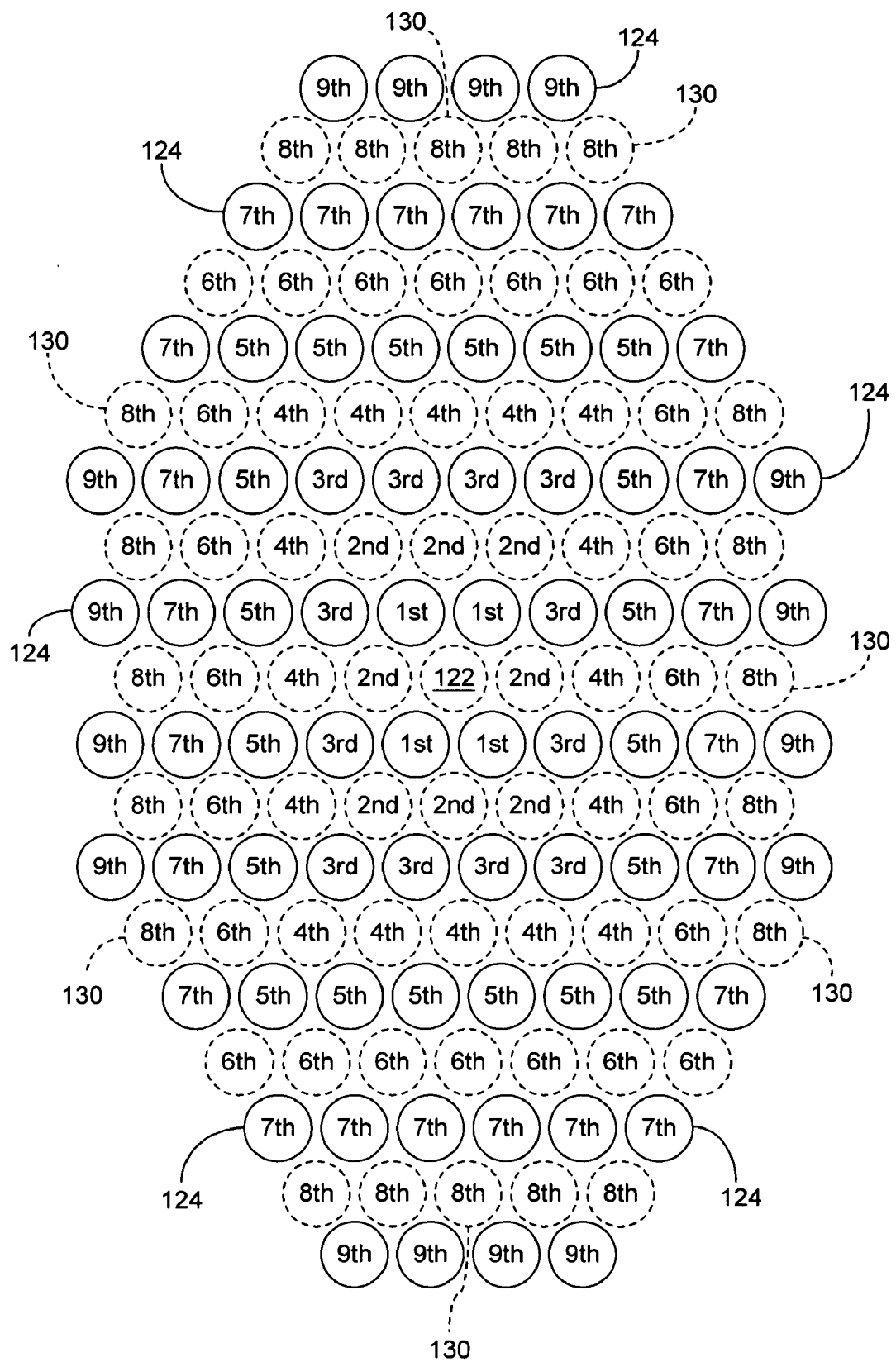
FIG. 5A is a diagram of the exit-pupil images produced by the diffraction grating of FIG. 4.
Figure 5B:
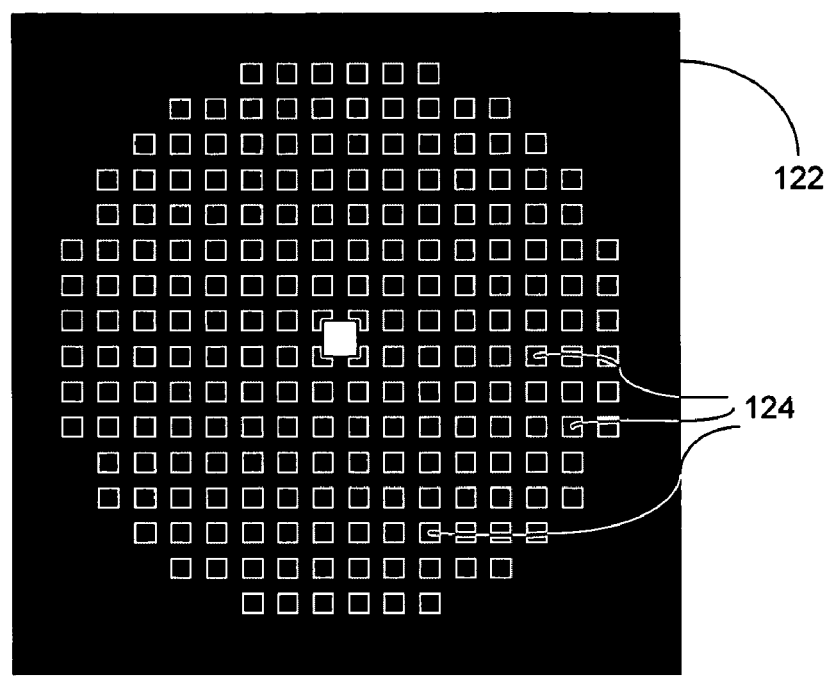
FIG. 5B is a diagram showing the relative unfiltered intensities of the exit-pupil images of FIG. 5A.

FIG. 5A shows the array of exit-pupil images 122 and 124 in the plane 120 of FIG. 4, and FIG. 5B shows the relative intensities of the images of FIG. 5A at a non-design wavelength of the beam 106 according to an embodiment of the invention.

Referring to FIGS. 4, 5A, and 5B, the diffraction grating 112 (discussed in greater detail below in conjunction with FIGS. 9, 10, 13A, and 13B) is a binary-phase, even-orders-missing (EOM) diffraction grating designed for a single wavelength of light. At the design wavelength, the center exit-pupil image 122 has zero intensity, i.e., is dark, and the peripheral exit-pupil images 124 have the same or approximately the same non-zero intensity. But, as shown in FIG. 5B, as the wavelength increases or decreases from the design wavelength, the center image 122 gets brighter while the other images 124 get dimmer—although each image 124 gets dimmer, it maintains the same or approximately the same intensity as the other images 124 for any wavelength. Consequently, in one embodiment, one designs the EOM grating 112 for the median of the expected wavelengths in the image beam 106 to maximize the minimum intensity of the peripheral images 124. Therefore, because the beam 106 includes visible wavelengths of light that enable it to scan an image that is visible to the human eye, in one embodiment the EOM grating 112 is designed for approximately 545 nanometers (nm)—the wavelength of yellow/green light—because this is the approximate median wavelength of visible light, which ranges from 420 nm (violet light) to 670 nm (red light).

More specifically, referring to FIGS. 5A and 5B, the exit-pupil image 122 is the $0^{th}$-order image of the array in the intermediate exit-pupil plane 120, the images 124 respectively represent the odd-order ($1^{st}$, $3^{rd}$, $5^{th}$, $7^{th}$, ...) images, and the images 130 represent the missing—and thus the dark—even-order ($2^{nd}$, $4^{th}$, $6^{th}$, $8^{th}$, ...) images. Although the images 122, 124, and 130 are circular in FIG. 5A, they may be square as in FIG. 5B or may have other shapes. As discussed above, the center image 122 is dark when the beam 106 (FIG. 4) includes the design wavelength and only the design wavelength of the grating 112 (FIG. 4), and has a nonzero intensity when the beam 106 includes a wavelength or wavelengths other than the design wavelength. Conversely, the even-order images 130 are dark for any wavelength or combination of wavelengths. Furthermore, as shown in FIG. 5B, the center image 122 may be significantly brighter than the peripheral images 124 for a wavelength or a combination of wavelengths other than the design wavelength. Therefore, if a viewer (not shown in FIGS. 5A–5B) could look at the array in the intermediate exit-pupil plane 120, the image he sees would appear significantly brighter when his pupil is directed toward the center of the array than it would when his pupil is directed toward the periphery of the array. As discussed above, this change in brightness as the viewer shifts his/her gaze may annoy or distract him/her.

Figure 5C:
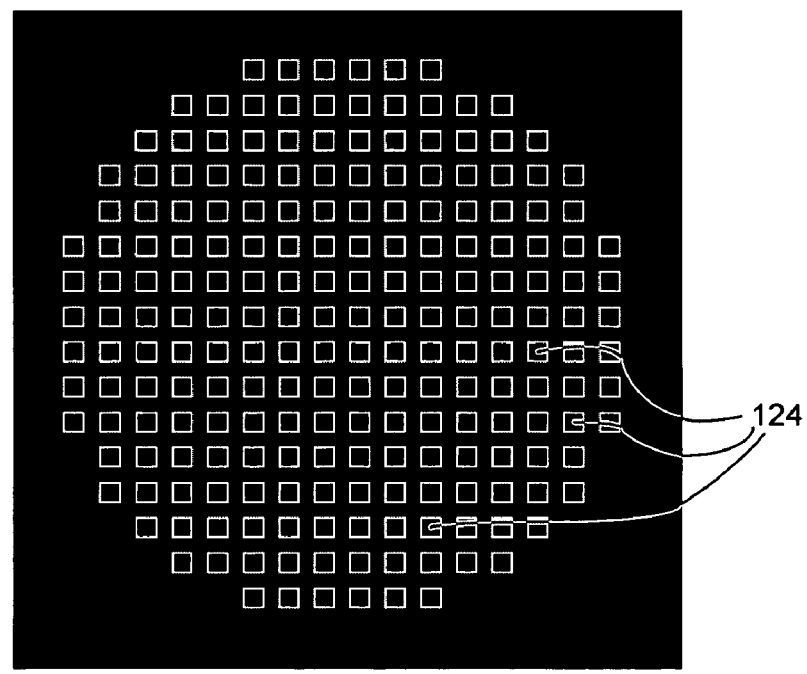
FIG. 5C is a diagram showing the relative filtered intensities of the exit-pupil images of FIGS. 5A and 5B.

FIG. 5C shows the relative intensities of the images 122 and 124 of FIG. 5A in the exit pupil 102 (FIG. 4) after the obscuration plate 126 (FIG. 4) filters them. As discussed below, the plate 126 completely blocks the center image 122, which is thus dark and not shown in the exit pupil 102. Furthermore, the images 124 each have the same or approximately the same intensity. In one embodiment, the images 124 are considered to have the same or approximately the same intensity if the difference in intensity between the brightest and dimmest images 124 divided by the sum of the intensities of the brightest and dimmest images 124 equals 0.30 or less.

More specifically, referring again to FIG. 4, the obscuration plate 126 is light transmissive to all the peripheral exit-pupil images 124, but is opaque to the center exit-pupil image 122, which the plate 126 thus blocks from propagating to the exit pupil 102. The plate 126 is located at the intermediate exit-pupil plane 120, and an appropriately sized and located blocking element 132 is formed as an integral part of or is attached to the plate 126. One can make the plate 126 from any light transmissive material and design it so that the plate 126 imparts little or no diffraction to the exit-pupil images 124 passing through it. Furthermore, one can use conventional techniques to make the appropriate section of the plate 126 opaque to form the blocking element 132 as an integral part of the plate 126. Or, one can attach opaque material to the plate 126 to form the blocking element 132 using any type of adhesive, preferably adhesive that is not adversely affected by heat, light, or moisture.

Although the plate 126 is located at the intermediate exit-pupil plane 120, the lens assembly 110 may include optical relays (not shown) to produce additional intermediate or exit-pupil planes where the plate 126 may be located.

Still referring to FIG. 4, the ocular 114 also includes lenses 134, a mirror 136, and a partially transmissive mirror 138. In one embodiment, the lenses 134 are cylindrical graded index (GRIN) lenses formed to minimize any additional diffraction of the exit-pupil images 122 and 124 passing through them. The lenses 134 gather the exit-pupil images 122 and 124 emanating from the EOM grating 112 and focus them at the intermediate exit-pupil plane 120, where the obscuration plate 126 is located. The mirror 136 reflects the exit-pupil images 124 (the plate 120 blocks the center image 122) onto the partially transmissive mirror 138, which reflects these images onto a mirror 139. The mirror 139 redirects the exit-pupil images 124 back through the partially transmissive mirror 138 to a display exit-pupil plane 140, where they form the exit pupil 102.

By using the partially transmissive mirror 138, the display system 100 (FIG. 3) may be advantageously mounted at any location not along the viewer's line of sight. For example, the scanning assembly 108 (FIG. 3), the EOM grating 112, the lenses 134 and the obscuration plate 126 can be mounted on a helmet or hat that, when worn, locates these components behind or adjacent the viewer's eyes. By removing these components from the viewer's line of sight, the viewer can simultaneously view the exit-pupil images 124 and his/her surroundings. For fighter pilots, race car drivers, or anyone who needs to maintain visual contact with the surrounding environment while also maintaining visual contact with engine gauges, gun sights or the like, this is significant.

Although FIG. 4 illustrates an ocular 114 having a specific number of lenses 134, mirrors 136 and partially transmissive mirror 138 in a specific combination, any number and combination may be used to gather the exit-pupil images 122 and 124 and focus them at intermediate and display exit-pupil planes 120 and 140. Also, even though FIG. 4 shows an EOM grating 112, the lens assembly 110 can include other types of diffraction gratings.

Referring again to FIGS. 4, 5A, 5B, and 5C, excessive intensity in the center exit-pupil image 122 can be created by a variety of means other than the image beam 106 having a wavelength different than the design wavelength of the EOM grating 112. For instance, minor manufacturing defects in the EOM grating 112 or the attachment of a liquid or fine particulate dust to the EOM grating 112 can generate excessive intensities in the central exit-pupil image 122. In addition, a failure of the scanning assembly 108 (FIG. 3) or the light source 104 (FIG. 3) can generate excessive intensities in the central exit-pupil image 122. Excessive intensity in the image 122 also may be created intentionally to generate a viewable exit pupil 102 in bright environments. But by blocking the image 122 in the intermediate plane 120, the plate 126 allows the images 124 in the exit-pupil 102 to have uniform or approximately uniform intensities regardless of why the image 122 is brighter than the images 124.

In addition, in another embodiment, the EOM grating 112, the obscuration plate 126, or both can be switched "on" or "off." When the grating 112 is "on", it generates the exit-pupil images 122, 124, and 130 as discussed above; when it is "off", it acts as non-diffracting glass such that the lens assembly 110 generates only the $0^{th}$-order exit-pupil image 122 in the intermediate exit-pupil plane 120. Similarly, when the obscuration plate 126 is "on", it attenuates the exit-pupil image 122 as discussed above; when it is "off", it allows the exit-pupil image 122 to pass through just as it allows the odd-order images 124 to pass through. Therefore, when both the grating 112 and plate 126 are "on", the lens assembly 110 generates the exit pupil 102 as discussed above. Conversely, when both the grating 112 and plate 126 are "off", the lens assembly 110 generates the exit-pupil image 122 and only the exit-pupil image 122 in the exit pupil 102. One application of turning both the grating 112 and the plate 126 "off" is where a viewer's eye (FIG. 3) is stable and focused only on the center of the exit pupil 102. Therefore, the peripheral exit-pupil images 124 are not needed, and they can be turned "off" so that all the power goes to the center exit-pupil image 122. This makes the image 122 brighter, and may allow one to reduce the image power. Such an on/off obscuration plate 126 can include a conventional LC material (not shown) or a conventional mechanical shutter (not shown) for the blocking element 132. Examples of an on/off grating 112 are discussed below in conjunction with FIGS. 15 and 16.

Moreover, in another embodiment, the obscuration plate 126 attenuates exit-pupil images other than the exit-pupil image 122 to generate the exit-pupil images 124 having non-uniform intensities. For example, a pilot may prefer the outer images 124 to be dimmer than the inner images 124. Such an obscuration plate 126 can include a conventional blocking or filtering material in the appropriate regions to cause the desired dimming or blocking. Or, the plate 126 may include LC material (not shown) or conventional mechanical shutter(s)/filters in these regions to allow turning of the dimming/blocking function "on" or "off".

Figure 6:
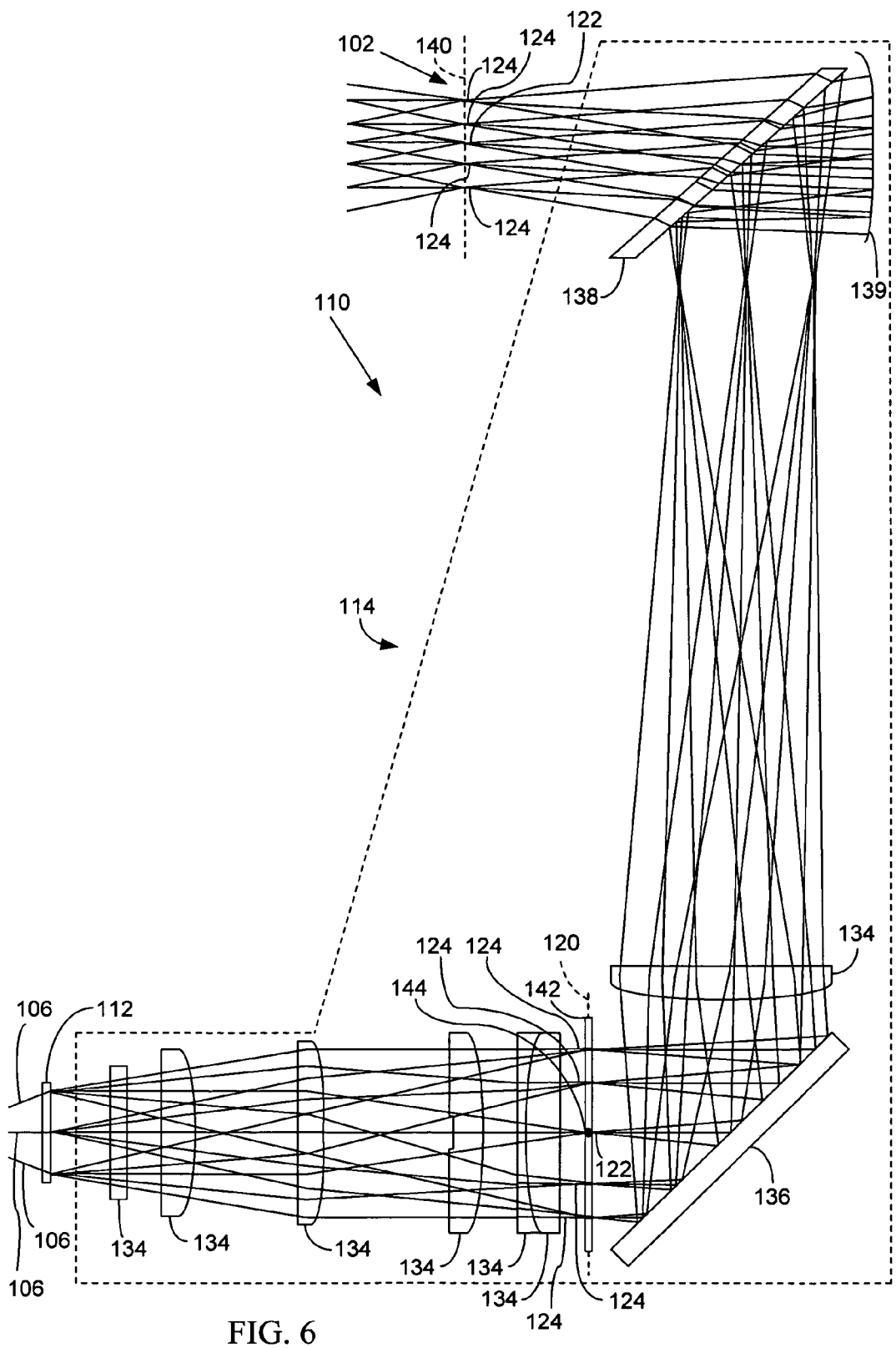
FIG. 6 is a diagram of the lens assembly of FIG. 3 according to another embodiment of the invention.

FIG. 6 is a diagram of the lens assembly 110 of FIG. 3 according to another embodiment of the invention. The diffracting grating 112 is a binary-phased diffraction grating that generates an array of exit-pupil images in an intermediate exit-pupil plane 120 where the center exit-pupil image 122 has a first intensity and the remaining exit-pupil images 124 each have or approximately have a second intensity that is less than the first intensity. The ocular 114 includes a filter 142, which unlike the obscuration plate 126 of FIG. 4, partially attenuates the center exit-pupil image 122 such that all the exit-pupil images 122 and 124 of the exit pupil 102 have the same or approximately the same intensity.

Figure 7A:
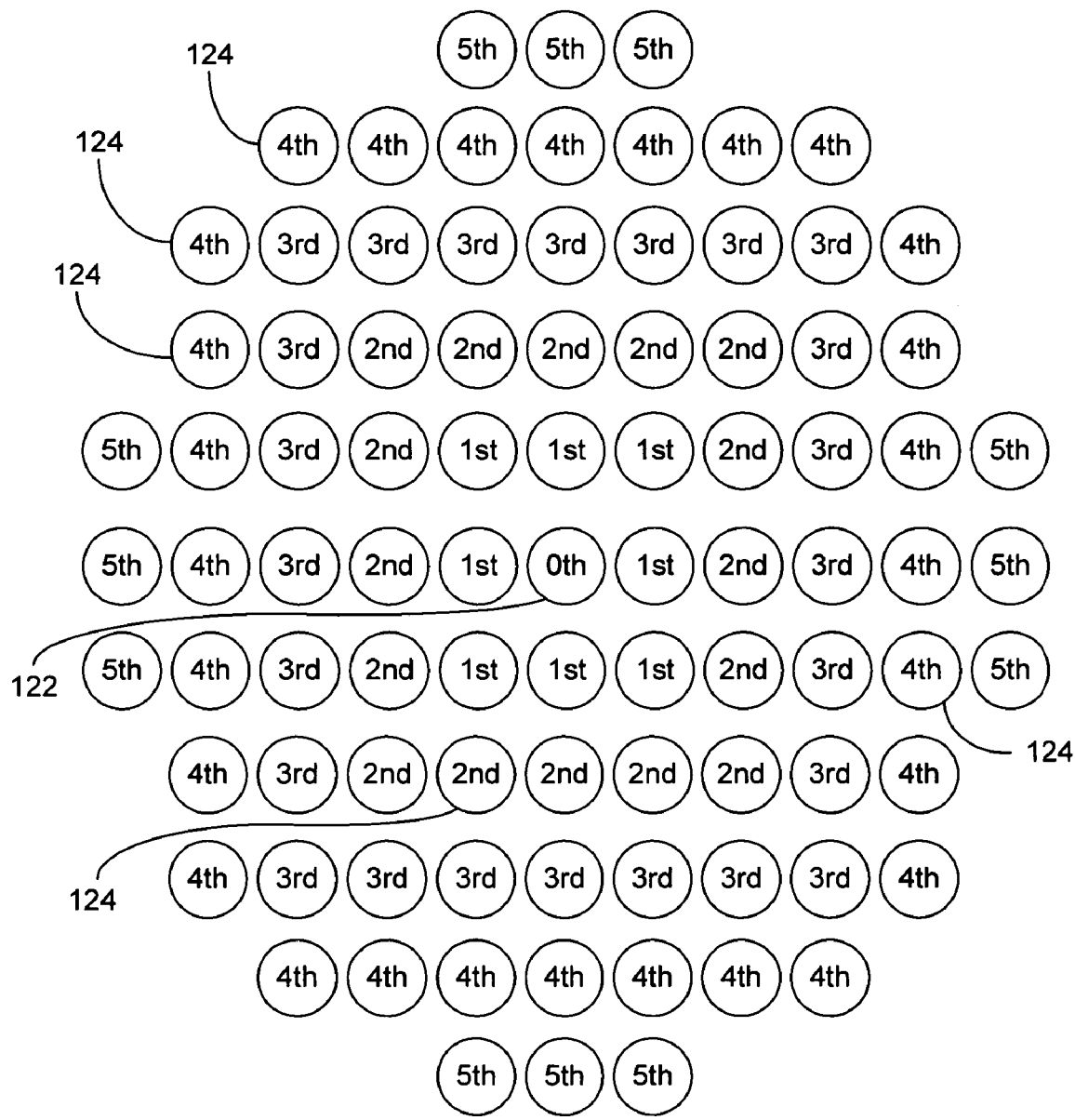
FIG. 7A is a diagram of an exit-pupil array produced by the diffraction grating of FIG. 6.
Figure 7B:
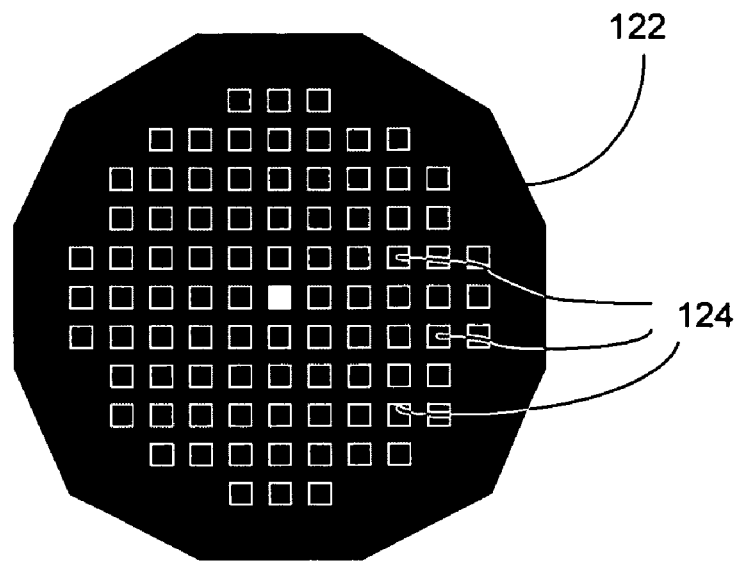
FIG. 7B is a diagram showing the relative unfiltered intensities of the exit-pupil images of FIG. 7A.

FIG. 7A shows the array of exit-pupil images 122 and 124 in the intermediate plane 120 of FIG. 6, and FIG. 7B shows the relative intensities of the images of FIG. 7A at a non-design wavelength of the beam 106 according to an embodiment of the invention.

Referring again to FIG. 6, the lens assembly 110 is similar to the lens assembly 110 of FIG. 4 except for two major differences. A binary-phase, (simple) diffraction grating 112 replaces the EOM grating of FIG. 4, and the filter 142 replaces the obscuration plate of FIG. 4. Therefore, the following discussion focuses on the simple grating 112 and the filter 142 and refers to the remaining, previously discussed structure of the ocular 114 using the previously identified names and numbers.

Referring to FIGS. 6, 7A, and 7B, the simple grating 112 (discussed in greater detail below in conjunction with FIGS. 9, 10, and 14) is designed for a single wavelength of light. At this wavelength, the center exit-pupil image 122 and the peripheral exit-pupil images 124 have the same or approximately the same non-zero intensities. But, as shown in FIG. 7B, as the wavelength increases or decreases from this single wavelength, the center image 122 gets brighter while the peripheral images 124 get dimmer—although each image 124 gets dimmer, it maintains the same or approximately the same intensity as the other images 124 for any wavelength. Consequently, as discussed above in conjunction with FIGS. 4–5C, in one embodiment one designs the simple grating 112 for 545 nm—the approximate median wavelength of visible light—to maximize the minimum intensity of the peripheral images 124 and to minimize the maximum intensity of the center image 122. Furthermore, as discussed above in conjunction with FIGS. 4–5C, manufacturing defects in or dust/liquid on the grating 112 may cause the center image 122 to be brighter than the peripheral images 124.

More specifically, referring to FIGS. 7A and 7B, the exit-pupil image 122 is the $0^{th}$-order image of the array in the intermediate exit-pupil plane 120, and the images 124 respectively represent the even and odd order ($1^{st}$, $2^{nd}$, $3^{rd}$, $4^{th}$, $5^{th}$, $6^{th}$, $7^{th}$ . . . ) images. Although the images 122 and 124 are circular in FIG. 7A, they may be square as in FIG. 7B or may have other shapes. As discussed above, the center image 122 has the same or approximately the same intensity as the peripheral images 124 when the beam 106 (FIG. 6) includes the design wavelength and only the design wavelength of the simple grating 112 (FIG. 6). And, as shown in FIG. 7B, the center image 122 has a greater intensity than the peripheral images 124 when the beam 106 includes a wavelength or wavelengths other than the design wavelength. Therefore, if a viewer (not shown in FIGS. 7A–7B) could look at the array in the intermediate exit-pupil plane 120, the image he sees would appear significantly brighter when his pupil is directed toward the center of the array than it would when his pupil is directed toward the periphery of the array. As discussed above, this change in brightness as the viewer shifts his/her gaze may annoy or distract him/her.

Figure 7C:
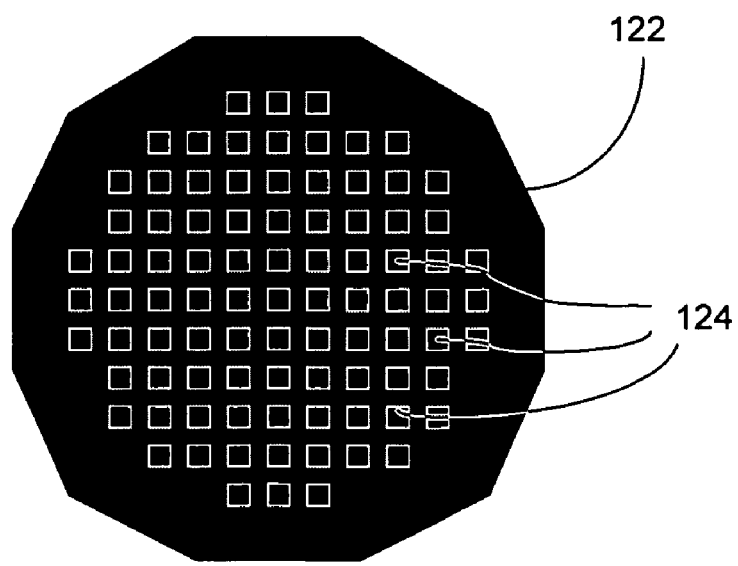
FIG. 7C is a diagram showing the relative filtered intensities of the exit-pupil images of FIGS. 7A and 7B.

FIG. 7C shows the relative intensities of the images 122 and 124 of FIG. 7A in the exit-pupil plane 102 after they are filtered by the filter 142 (FIG. 6). As discussed below, the filter 142 partially attenuates the center image 122, thus causing it to have the same or approximately the same intensity as each of the peripheral images 124 in the plane 102. In one embodiment, the images 122 and 124 are considered to have the same or approximately the same intensity if the difference in intensity between the brightest and dimmest images 122 and 124 divided by the sum of the intensity of the brightest and dimmest images 122 and 124 equals 0.30 or less.

More specifically, referring to FIG. 6, the filter 142 is equally light transmissive to all the exit-pupil images 124, but is less transmissive to the center exit-pupil image 122, which the filter 142 thus attenuates but does not block. The filter 142 is located at the intermediate exit-pupil plane 120, and an appropriately sized and located filtering element 144 is formed as an integral part of or is attached to the filter 142. One can make the filter 142 from any light transmissive material and design it so that the filter 142 imparts little or no diffraction to the exit-pupil images 122 and 124 passing through it. Furthermore, one can use conventional techniques to make the appropriate section of the filter 142 partially transmissive to form the filtering element 144 as an integral part of the filter 142. Or, one can attach partially transmissive material to the filter 142 to form the filtering element 144 using any type of adhesive, preferably adhesive that is not adversely affected by heat, light, or moisture.

Although the filter 142 is located at the intermediate exit-pupil plane 120, the lens assembly 110 may include optical relays (not shown) to produce additional intermediate or exit-pupil planes where the filter 142 may be located. Moreover, in some applications, it may be desirable to place filters at more than one intermediate or exit-pupil plane.

In addition, although FIG. 6 illustrates an ocular 114 having a specific number of lenses 134, mirrors 136 and partially transmissive mirrors 138 in a specific combination, any number and combination may be used to gather the exit-pupil images 122 and 124 and focus them at intermediate and display exit-pupil planes 120 and 140. Also, even though FIG. 6 shows a simple grating 112, the lens assembly 110 can include other types of diffraction gratings.

Furthermore, the simple grating 112, the filter 142, or both can be designed to switch "on" or "off" as discussed above in conjunction with FIGS. 4–5C.

Figure 8:
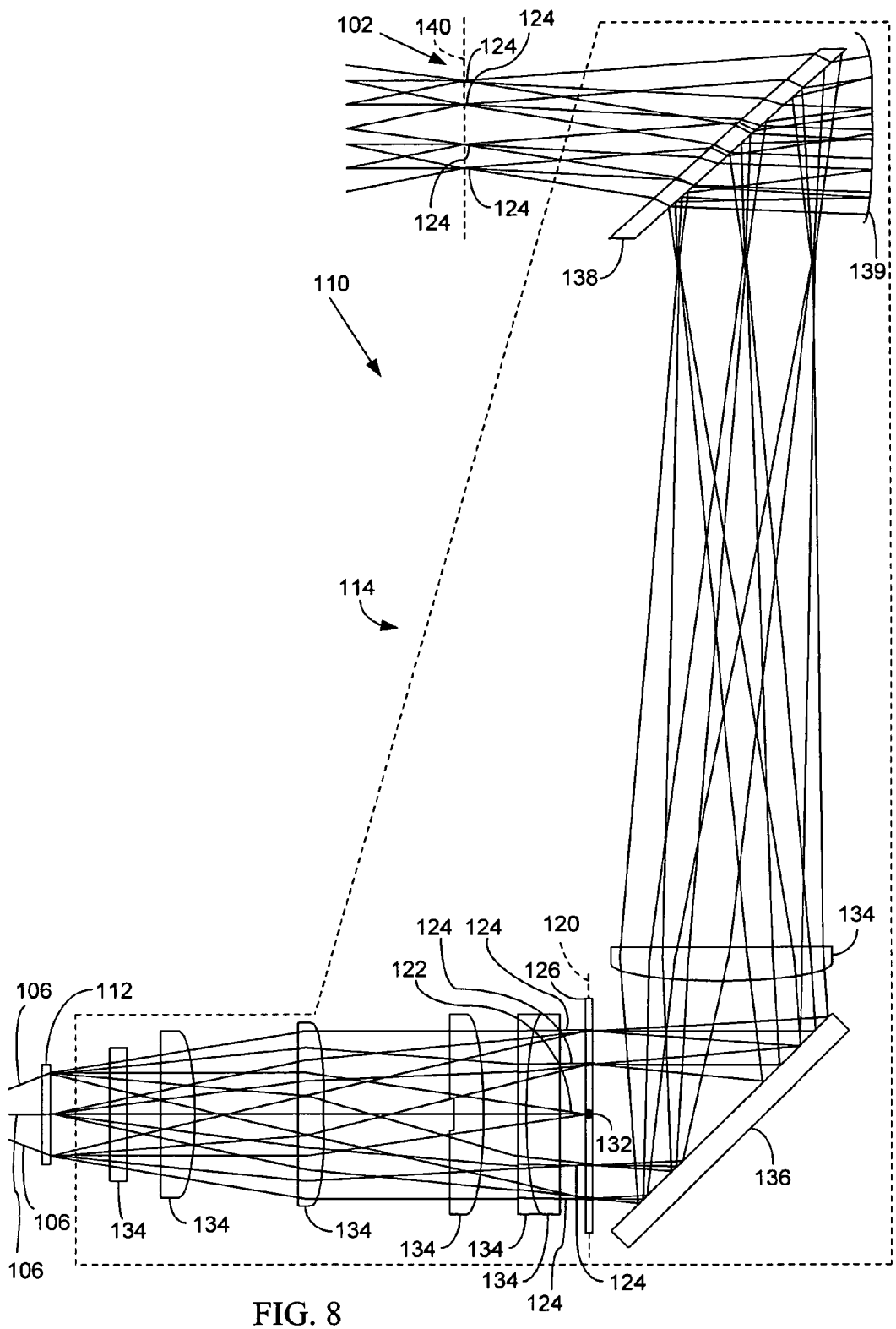
FIG. 8 is the lens assembly of FIG. 3 according to yet another embodiment of the invention.

FIG. 8 is a diagram of the lens assembly 110 of FIG. 3 according to another embodiment of the invention. This lens assembly 110 is similar to the previously described lens assembly of FIG. 4 except for one major difference; a multi-phase, even-orders-missing (multi-phase EOM) diffraction grating 112 replaces the binary-phase, EOM grating 112 of FIG. 4. Typically, the multi-phase EOM grating 112 (discussed in greater detail below in conjunction with FIGS. 11 and 12) is less sensitive to an increase or decrease from the design wavelength than the binary-phase EOM grating of FIG. 4. That is, for a given increase or decrease in the design wavelength, the intensities of the center exit-pupil image 122 and the peripheral exit-pupil images 124 change less with the multiphase EOM grating 112 than they do with the binary-phase EOM grating. Otherwise, the structure and operation of the lens assembly 110 of FIG. 4 is similar to the structure and operation of the lens assembly 110 of FIG. 8.

Figure 9:
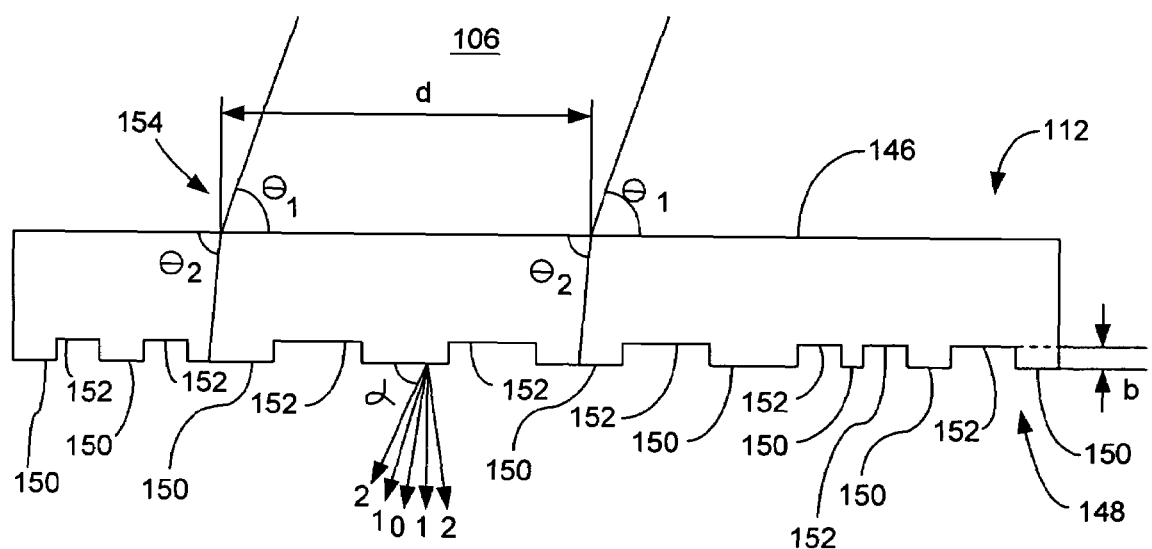
FIG. 9 is a cross-sectional view of the diffraction gratings of FIGS. 4 and 6 according to an embodiment of the invention.

FIG. 9 is a cross-sectional view of the binary-phase EOM diffraction grating 112 of FIG. 4 and the simple binary-phase diffraction grating 112 of FIG. 6 according to an embodiment of the invention. The grating 112 has a beam-incident side 146 and a beam-emanating side 148, which includes raised and recessed surfaces 150 and 152. For an incident light beam 106 having the design wavelength of the grating 112, components (not shown) of the light beam 106 emanating from the surface 150 are or are approximately π radians (180°) out of phase with components (not shown) emanating from the surface 152. Because the side 148 has only two surfaces 150 and 152, the emanating light-beam components can have only one of two phases; hence the term "binary phase." By shifting the phase of the beam components emanating from the surface 150 with respect to the beam components emanating from the surface 152, the grating 112 generates an interference pattern that results in the array of exit-pupil images 122 and 124 of FIGS. 5A–5B or of FIGS. 7A–7B. The arrows show the relative directions of the resulting interference components, and the arrow labels indicate the orders of the interference components, which correspond to the orders of the exit-pupil images 122 and 124 of FIGS. 5A and 7A. Although the EOM diffraction grating 112 of FIG. 4 and the simple grating 112 of FIG. 6 may have similar cross sections, they have different patterns of the surfaces 150 and 152 formed on the side 148 as discussed below in conjunction with FIGS. 13A–14.

Still referring to FIG. 9, in one embodiment the beam-incident side 146 and the raised and recessed surfaces 150 and 152 of the grating 112 are planar or approximately planar and are parallel or approximately parallel to each other. To produce opposite phases in the emanating components (not shown) of the incident light beam 106, the difference b in height between the surfaces 150 and 152 is determined from the following equation, which is discussed further in "Diffractive Exit Pupil Expander for Display Applications," by Hakan Urey, to be published in a 2001 feature issue of Applied Optics focusing on Diffractive Optics and Micro-optics, and which is incorporated by reference:

$$b = \frac{\lambda \phi}{2\pi(n-1)} \quad (1)$$

where λ equals the design wavelength of the grating 112 in the medium (e.g., air) in which the grating 112 is disposed, φ is the desired phase difference (here π radians) between the beam components emanating from the surface 150 and those emanating from the surface 152, and n is the index of refraction for the material from which the grating 112 is constructed. As discussed above in FIGS. 4 and 6, because the incident light beam 106 often includes wavelengths other than λ, some wavelengths of the emanating beam components may not be π radians out of phase with one another. This typically causes the center exit-pupil image 122 to be brighter than the peripheral images 124, and thus typically requires that the ocular 114 include the block 126 or filter 142 as discussed above in conjunction with FIGS. 4–7C.

In operation of the diffracting grating 112, at any particular instant the scanning assembly 108 (FIG. 3) directs the incident light beam 106 onto a region 154 of the side 146, the region 154 having a dimension d. The beam 106 propagates through the grating 112 at a refraction angle $\theta_2$ that depends on the index of refraction n of the grating and the angle of incidence $\theta_1$. As discussed above, the phase differences caused by the surfaces 150 and 152 generate an interference pattern that is graphically represented by the resulting interference components. The angles α at which these resulting interference components emanate from the side 148 depend on the angles $\theta_1$ and $\theta_2$ and the wavelength of the incident light beam 106. Each of these resulting interference components respectively forms a pixel of the corresponding exit-pupil image 122 and 124 of FIG. 5A or 7A. As the scanning assembly 108 (FIG. 3) scans the beam 106 across the side 146, the interference pattern generates additional pixels as the resulting components effectively scan the respective exit-pupil images 122 and 124.

In one embodiment, the grating 112 can be made of any light-transmissive material, such as glass, plastic, or the like, having an index of refraction different from the medium surrounding it. Furthermore, one can conventionally etch the surfaces 150 and 152 on the side 148.

Still referring to FIG. 9, although the side 146 and surfaces 150 and 152 are described as being planar and parallel, in other embodiments they may have different characteristics. For example, the side 146 and the surfaces 150 and 152 may be convex or concave. In addition, although the grating 112 is described and shown with the beam-emanating side 148 including the raised and recessed surfaces 150 and 152, the beam-incident site 146 may include the surfaces 150 and 152 instead of the beam-emanating side 148.

Figure 10:
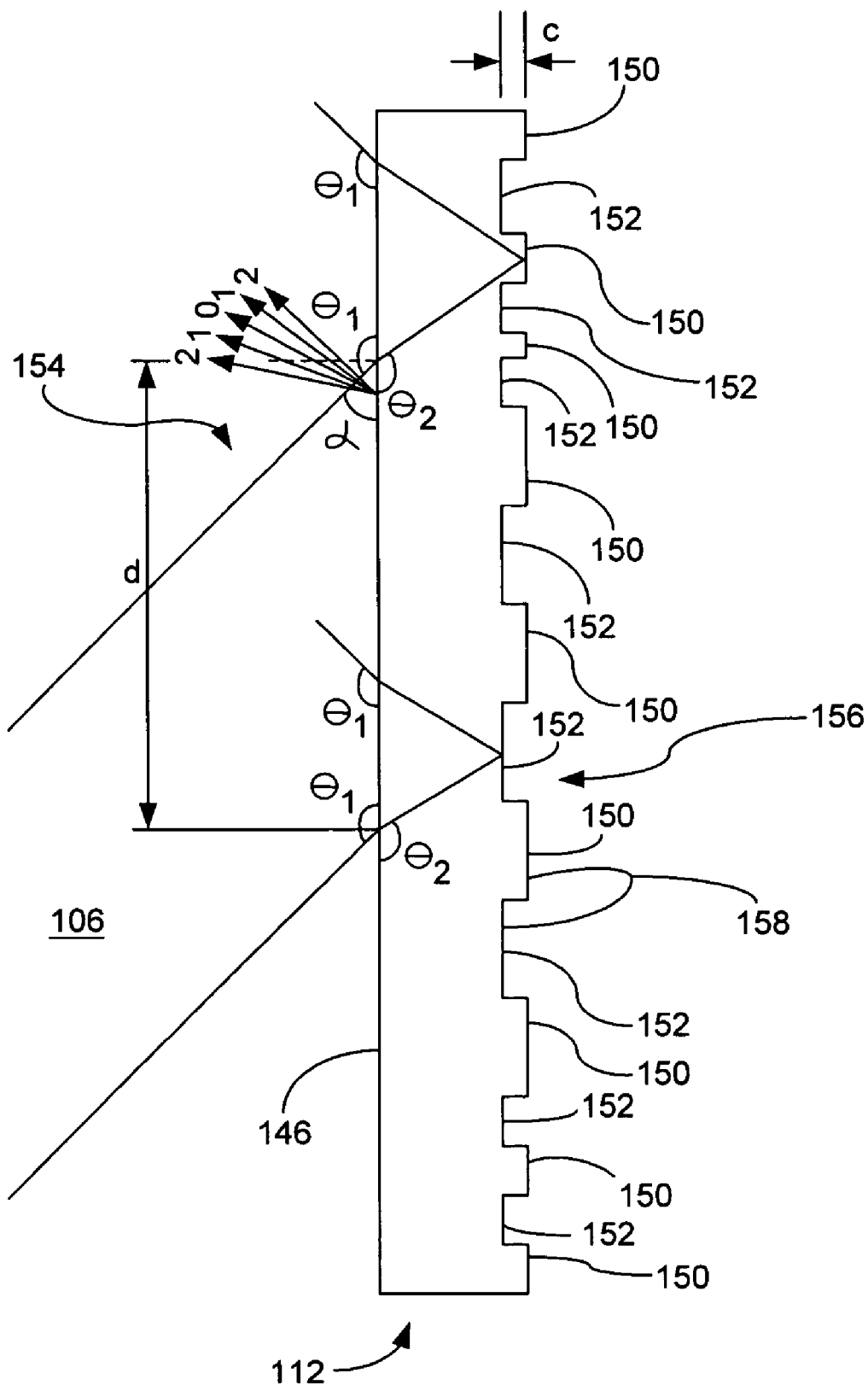
FIG. 10 is a cross-sectional view of the diffraction gratings of FIGS. 4 and 6 according to another embodiment of the invention.

FIG. 10 is a cross-sectional view of the binary-phase EOM diffraction grating 112 of FIG. 4 and the simple binary-phase diffraction grating 112 of FIG. 6 according to another embodiment of the invention. The binary-phase diffraction grating 112 of FIG. 10 is similar to the grating 112 of FIG. 9 except that the grating 112 of FIG. 10 has a beam-reflecting side 156, which enables one to locate the ocular 114 on the same side of the grating as the scanning assembly 108 (FIG. 3).

More specifically, the grating 112 of FIG. 10 has a beam-incident side 146 and a beam-reflecting side 156, which includes raised and recessed surfaces 150 and 152 that each have a reflective coating 158. For an incident light beam 106 having the design wavelength of the grating 112, components (not shown) of the light beam 106 reflected from the surface 150 are or are approximately π radians (180°) out of phase with components (not shown) reflected from the surface 152. Thus, as previously discussed in conjunction with FIG. 9, the grating 112 generates an interference pattern that results in the array of exit-pupil images 122 and 124 of FIGS. 5A–5B or of FIGS. 7A–7B. The arrows show the relative directions of the resulting interference components, and the arrow labels indicate the component orders, which correspond to the orders of the exit-pupil images 122 and 124 of FIGS. 5A and 7A. Although the binary-phase EOM grating 112 of FIG. 4 and the simple binary-phase grating 112 of FIG. 6 may have similar cross sections, they have different patterns of the surfaces 150 and 152 formed on the side 156 as discussed below in conjunction with FIGS. 13A–14.

Still referring to FIG. 10, to produce opposite phases in the reflected beam components (not shown) of the incident light beam 106, the difference c in height between the surfaces 150 and 152 is determined from the following equation:

$$c = \frac{\lambda \phi}{2\pi(n)} \quad (2)$$

where, $\lambda$, $\phi$, and n represent the same quantities that they do in equation (1).

That is, referring to equation (1) c≠b because the beam-reflecting side 156 reflects the incident light beam 106 back toward the beam-incident side 146, and thus the incident beam 106 travels through an additional distance of the grating 112. Therefore, the difference c in height between the surfaces 150 and 152 accounts for this additional travel.

In operation of the diffraction grating 112 of FIG. 10, at any particular instant the scanning assembly 108 (FIG. 3) directs the incident light beam 106 onto a region 154 of the side 146, the region 154 having a dimension d. The beam 106 propagates through the grating 112 at a refraction angle $\theta_2$ that depends on the index of refraction n of the grating and the angle of incidence $\theta_1$. The surfaces 150 and 152 reflect the beam 106 back toward the beam-incident side 146 and generate the interference pattern that is graphically represented by the resulting interference components. As previously discussed in conjunction with FIG. 9, each of these resulting components respectively forms a pixel of the corresponding exit-pupil image 122 and 124 of FIG. 5A or 7A.

In one embodiment, the grating 112 can be made of any light-transmissive material, such as glass, plastic, or the like, having an index of refraction different from the medium surrounding it. Furthermore, the reflective coating 158 can be any conventional coating that reflects light. Moreover, one can conventionally etch the surfaces 150 and 152 on the side 158 and attach the reflective coating 158 using conventional techniques.

Still referring to FIG. 10, although the side 146 and surfaces 150 and 152 are described as being planar and parallel, in other embodiments they may have different characteristics. For example, the side 146 and the surfaces 150 and 152 may be convex or concave.

Figure 11:
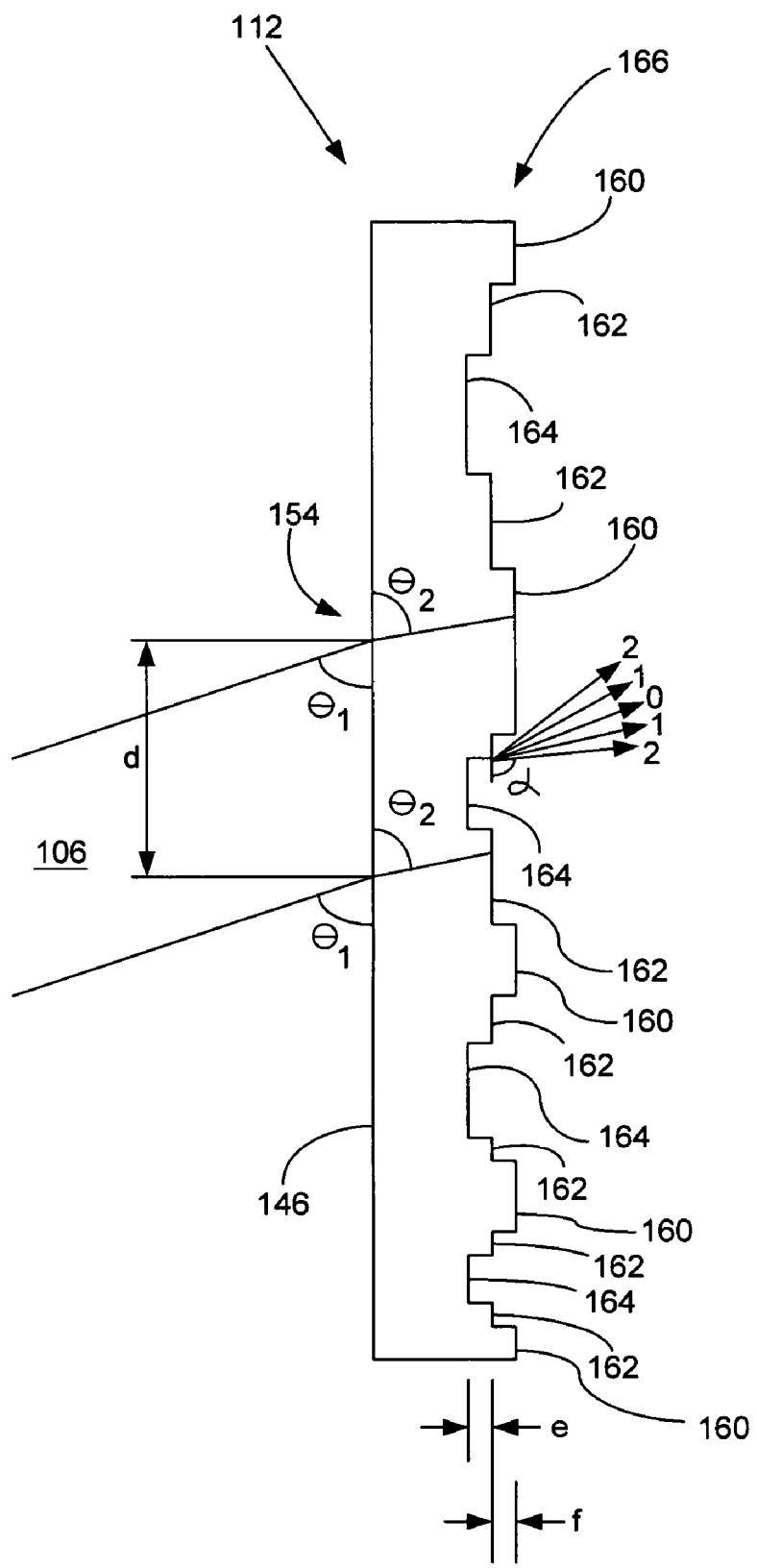
FIG. 11 is a cross-sectional view of the diffraction grating of FIG. 8 according to an embodiment of the invention.

FIG. 11 is a cross-sectional view of the multi-phase EOM diffraction grating 112 of FIG. 8 according to an embodiment of the invention. The multi-phase EOM grating is similar to the binary-phase EOM grating 112 of FIG. 9 except that the multi-phase EOM grating 112 has three or more surfaces—here three surfaces 160, 162 and 164—on the beam-emanating side 166 instead of only two surfaces (150 and 152 in FIG. 9).

Still referring to FIG. 11, the grating 112 has a beam-incident side 146 and the beam-emanating side 166, which includes raised and recessed surfaces 160, 162, and 164. For an incident light beam 106 having the design wavelength of the grating 112, components (not shown) of the light beam 106 emanating from the surface 160 are or are approximately 2π/3 radians (120°) out of phase with beam components (not shown) emanating from the surfaces 162 and 164. And, the components (not shown) of the light beam 106 emanating from the surface 162 are or are approximately 2π/3 radians (120°) out of phase with beam components (not shown) emanating from the surfaces 160 and 164. But although equal height differences between the surfaces 160, 162, and 164 and equal phase differences between the beam components emanating therefrom are discussed, these height and phase differences may be unequal. Because the side 166 has more than two surfaces 160, 162, and 164, the emanating light-beam components have more than two phases; hence the term "multiple phase." By shifting the phase of the beam components emanating from the surface 160 with respect to the beam components emanating from the surfaces 162 and 164, the grating 112 generates an interference pattern that results in the array of exit-pupil images 122 and 124 of FIGS. 5A–5B. The arrows show the relative directions of the resulting interference components, and the arrow labels indicate the interference-component orders, which correspond to the orders of the exit-pupil images 122 and 124 of FIGS. 5A–5B.

Still referring to FIG. 11 in one embodiment, the beam-incident side 146 and the raised and recessed surfaces 160, 162 and 164 are planar or approximately planar and are parallel or approximately parallel to each other. To produce a 2π/3 radians (120°) difference in phase between the emanating components (not shown) of the incident light beam 106, the difference e in height between the surfaces 162 and 164 and the difference f in height between the surfaces 160 and 162 are given by the following equations:

$$e = \frac{\lambda \phi}{3\pi(n-1)} \quad (3)$$

$$f = \frac{\lambda \phi}{3\pi(n-1)} \quad (4)$$

where λ, φ, and n represent the same quantities that they do in equations (1) and (2).

As discussed above in FIG. 8, because the incident light beam 106 often includes wavelengths other than λ, some wavelengths of the emanating beam components may not be 2π/3 radians out of phase with one another. This may cause the center exit-pupil image 122 to be brighter than the peripheral images 124, and thus may require that the ocular 114 include the block 126 or a partial attenuator.

In operation, the diffracting grating 112 is similar to the diffraction grating 112 of FIG. 9 except that three surfaces 160, 162 and 164 cause the phase differences, and thus generate the interference pattern, as the beam 106 exits the side 166. As the scanning assembly 108 (FIG. 3) scans the beam 106 across the side 146, the interference pattern generates the pixels of the exit-pupil images 122 and 124 of FIG. 5A.

In one embodiment, the grating 112 can be made of any light-transmissive material, such as glass, plastic, or the like, having an index of refraction different from the medium surrounding it. Furthermore, one can conventionally etch the surfaces 160, 162, and 164 on the side 166.

Still referring to FIG. 11, although the side 146 and surfaces 160, 162 and 164 are described as being planar and parallel, in other embodiments they may have different characteristics. For example, the side 146 and the surfaces 160, 162 and 164 may be convex or concave. Also, the grating 112 can have more than the three surfaces 160, 162 and 164 on the beam-emanating side 166 to cause phase differences among the emanating components of the beam 106. In addition, although the diffraction grating 112 is a multi-phase EOM grating, the grating 112 also can be a simple multi-phase grating with a cross section similar to the multi-phase EOM grating. Such a simple multi-phase grating can be used in the lens assembly 110 of FIG. 6. However, even though the cross sections are similar, the multi-phase EOM and simple multi-phase gratings would have different patterns of the surfaces 160, 162 and 164 formed on the side 166 as discussed below in conjunction with FIGS. 13A–14.

Figure 12:
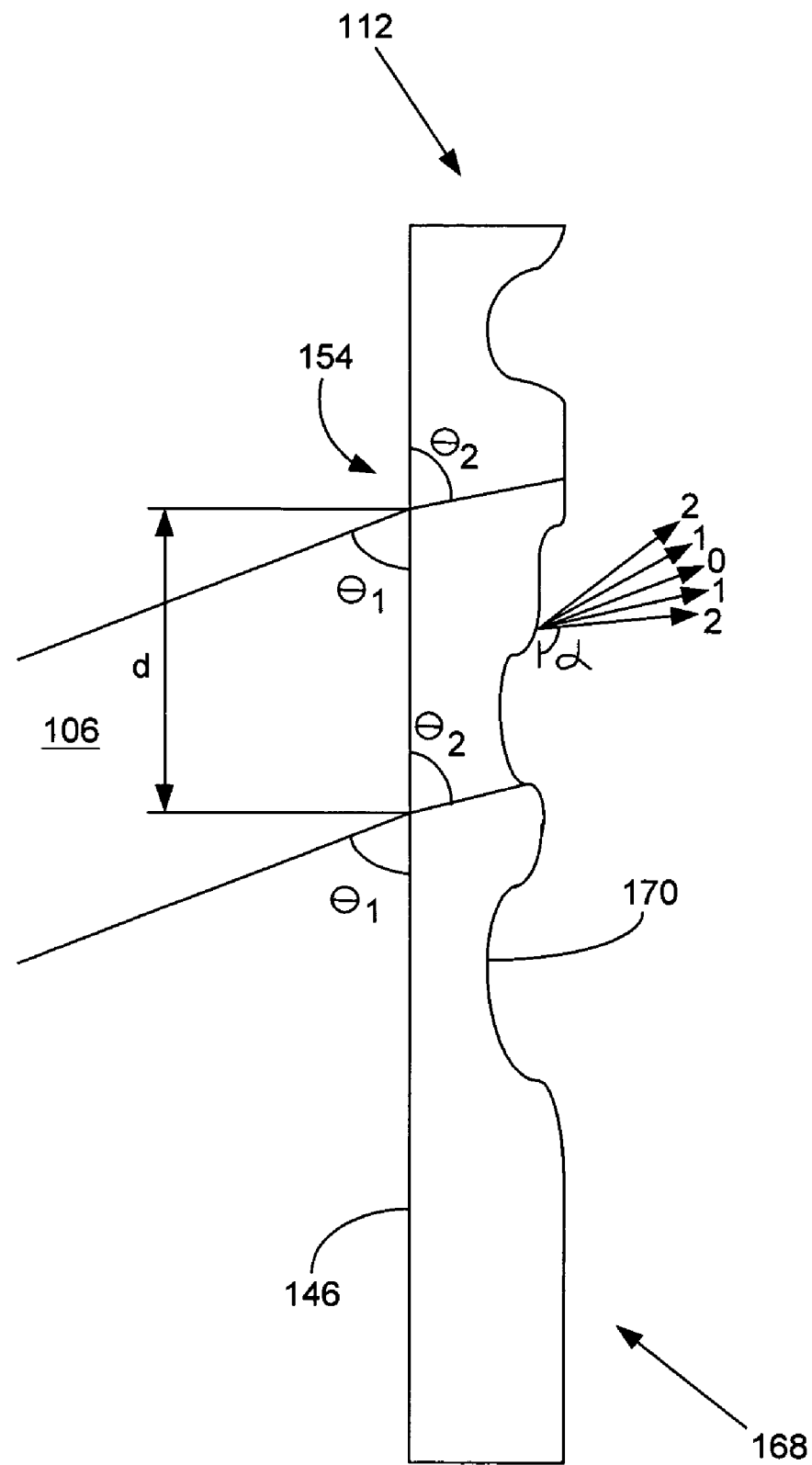
FIG. 12 is a cross-sectional view of the diffraction grating of FIG. 8 according to another embodiment of the invention.

FIG. 12 is a cross-sectional view of the multi-phase diffraction grating 112 of FIG. 8 according to another embodiment of the invention. The grating 112 is a multi-phase grayscale (grayscale) diffraction grating and is similar to the multi-phase EOM grating 112 of FIG. 11 with one major exception. The beam-emanating side 168 includes a surface 170 defined by a continuous curve instead of three discrete surfaces 160, 162, and 164 (FIG. 11).

Figure 13A:
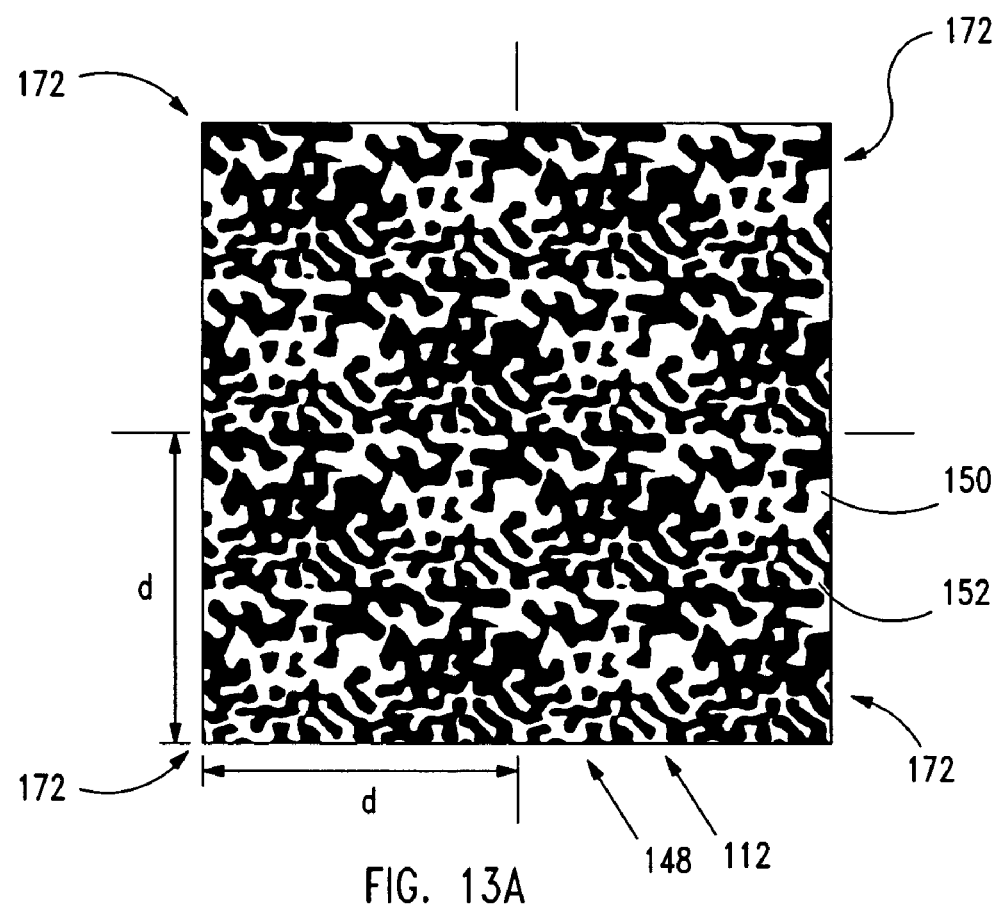
FIG. 13A is a close-up plan view of the diffraction grating of FIG. 4 according to an embodiment of the invention.
Figure 13B:
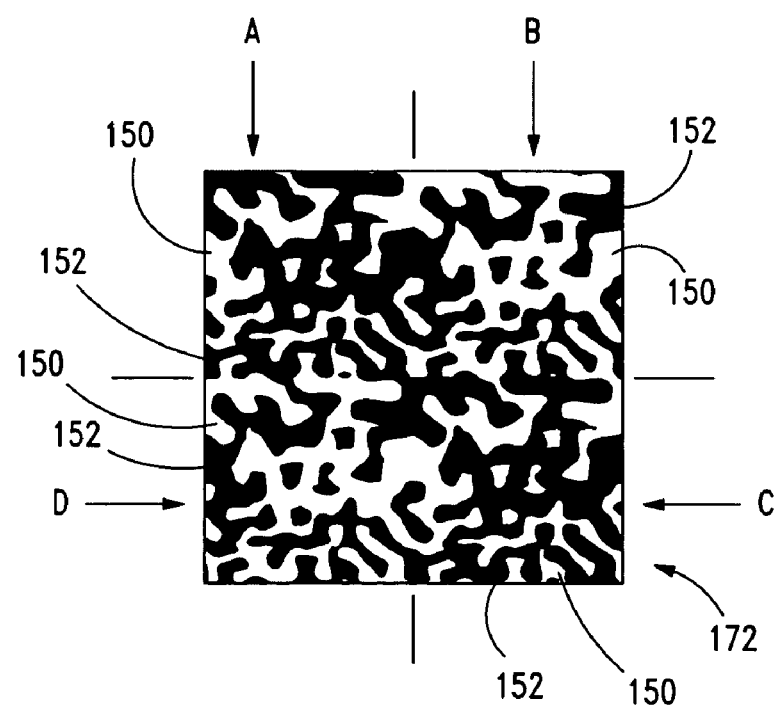
FIG. 13B is a close-up plan view of one of the quadrants of the diffraction grating of FIG. 13A.
Figure 14:
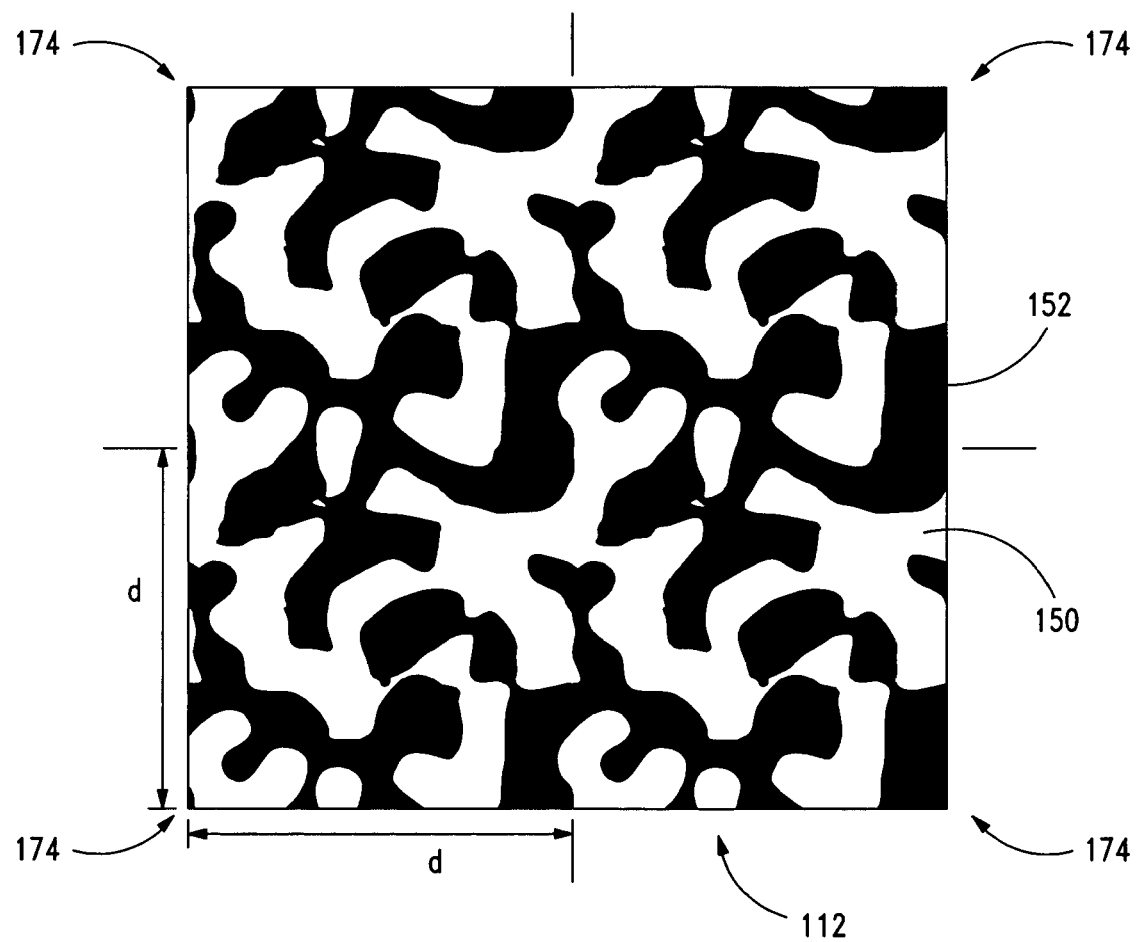
FIG. 14 is a close-up plan view of the diffraction grating of FIG. 6 according to an embodiment of the invention.

Referring to FIGS. 13A–14, the construction of the diffraction gratings 112 of FIGS. 4, 6, and 9 are discussed.

FIGS. 13A and 13B are plan views of the interference-pattern-emanating side 148 of the binary-phase EOM diffracting grating 112 of FIGS. 4 and 9 according to an embodiment of the invention. The light and dark portions of the grating 112 represent a relief pattern. In one embodiment, the light portions of the grating 112 represent the raised surfaces 150 (FIG. 9), and the dark portions represent the recessed surfaces 152; but in another embodiment, the dark portions represent the raised surfaces and the light portions represent the recessed surfaces. But either way, the grating 112 generates the exit-pupil images 122 and 124 of FIG. 5A.

Referring to FIG. 13A, each quadrant, i.e., cell region, 172 has the same relief pattern as the other regions 172, has dimensions d×d, and represents a respective pixel region of the grating 112. That is, when the beam 106 (FIG. 9) strikes a region 172, the grating 112 generates the corresponding pixels of the exit-pupil images 122 and 124 (FIG. 5A). Therefore, although omitted for clarity, the grating 112 typically includes an array of regions 172, the array having the same dimensions, in pixels, as the scanned and exit-pupil images. In one embodiment, the cross section of the beam 106 (FIG. 4) where it strikes the grating 112 is square and has or approximately has the dimensions d×d, although the cross section may be circular and have or approximately have a diameter of d. The beam cross section being approximately the same size as each region 172 typically ensures that the peripheral exit-pupil images 124 (FIG. 5A) each have same or approximately the same intensity, and that the images 124 (image 122 is blocked) uniformly fill the exit pupil 102 without overlapping one another. If the beam cross section is significantly smaller than the region 172, then the intensities of the images 124 may be different and may change, thus causing flicker, as the beam 106 scans across the grating 112, and the images 124 may overlap one another. Conversely, if the beam cross section is significantly larger than the region 172, then the images 124 may be significantly smaller than they are when the beam cross section is the same or approximately the same size as the region 172.

FIG. 13B is a plan view of quadrants A–D of a cell region 172 of FIG. 13A. The quadrants A and C have a first relief pattern that is the inverse of the second relief pattern of the quadrants B and D. "Inverse" means that the regions occupied by the surfaces 150 and 152 (light and dark regions, respectively) in one quadrant, for example quadrant A, are respectively occupied by the surfaces 152 and 150 (dark and light regions, respectively) of the inverse quadrant, for example quadrant D. Although specific first and second relief patterns are shown, other relief patterns can provide the same exit pupil 102 (FIG. 4) or a similar exit pupil as long as the first relief pattern in quadrants A and C is the inverse of the second relief pattern in quadrants B and D.

Referring to FIGS. 13A and 13B, although the cell regions 172 are square, they can have other shapes such as pentagons, hexagons or any other shape where all the boundaries of each region 172 are shared with other regions 172, i.e., there are no "empty" spaces between the regions 172.

FIG. 14 is a plan view of the interference-pattern-emanating side 148 of the simple binary-phase diffracting grating 112 of FIGS. 6 and 9 according to an embodiment of the invention. The light and dark portions of the grating 112 represent a relief pattern. In one embodiment, the light portions of the grating 112 represent the raised surfaces 150 (FIG. 9), and the dark portions represent the recessed surfaces 152; but in another embodiment, the dark portions represent the raised surfaces and the light portions represent the recessed surfaces. But either way, the grating 112 generates the exit-pupil images 122 and 124 of FIG. 7A.

Referring to FIG. 14, each quadrant, i.e., cell region, 174 has the same relief pattern as the other regions 174, has dimensions d×d, and represents a respective pixel region of the grating 112. That is, when the beam 106 (FIG. 9) strikes a region 174, the grating 112 generates the corresponding pixels of the exit-pupil images 122 and 124 (FIG. 7A). Therefore, although omitted for clarity, the grating 112 typically includes an array of regions 174, the array having the same dimensions, in pixels, as the scanned and exit-pupil images. For the reasons discussed above in conjunction with FIGS. 13A and 13B, in one embodiment the cross section of the beam 106 where it strikes the grating 112 is square and has or approximately has the dimensions d×d, although the cross section may be circular and have or approximately have a diameter of d.

Although a specific relief pattern is shown, other relief patterns can provide the same exit pupil 102 (FIG. 6) or a similar exit pupil. Furthermore, although the cell regions 174 are square, they can have other shapes such as pentagons, hexagons or any other shape where all the boundaries of each region 174 are shared with other regions 174.

FIG. 15 is a side view of an on/off diffraction grating 112 according to an embodiment of the invention discussed above in conjunction with FIGS. 4–5C. When the grating 112 is "on", it diffracts an image into multiple exit-pupil images as discussed above in conjunction with FIGS. 4–8; but when the diffraction grating is "off", it effectively passes through the image to generate the $0^{th}$-order exit-pupil image 122 and only the $0^{th}$-order exit-pupil image.

The on/off grating 112 includes electrodes 180a and 180b, a diffraction-grating layer 182, and an electro-optic layer 184. The electrodes 180a and 180b connect to the respective terminals of an AC power source (not shown), are formed from a transparent conductive film such as conventional Indium Tin Oxide (ITO), and have sides 186a and 186b and 188a and 188b, respectively. The diffraction-grating layer 182 has an index of refraction $n_d$ and is typically similar to one of the gratings 112 discussed above in conjunction with FIGS. 4–10 and 13A–14, although the layer 182 may be similar to the gratings 112 of FIGS. 11 and 12 or have other relief patterns. The electro-optic layer 184 has an index of refraction $n_{eo}$ that changes in response to the magnitude, direction, or both of an electric field across the layer 184, and is formed from an electro-optic material such as conventional quartz. Ideally, $n_d=n_{eo}$ when there is a nonzero electric field between the electrodes 180a and 180b, and $n_{eo}$ equals the n of air when there is a zero electric field between the electrodes 180a and 180b. In practice, because $n_{eo}$ often does not equal these ideal values and because the interface 189 between the layers 182 and 184 has corners 190, i.e., is not planar, the relief pattern (e.g., FIGS. 13A–14) formed in the diffraction layer 182 can be altered to account for the mismatched indices of refraction. Because techniques for altering the relief pattern of the layer 182 are known, they are omitted here for brevity.

Furthermore, as long as the sides 186a, 186b, 188a, and 188b of the electrodes 180a and 180b are planar, they have little or no adverse affect on the generation of the exit pupil.

In operation, the diffraction grating 112 generates an expanded exit pupil having multiple exit-pupil images (e.g., FIG. 4), and is thus "on", when no electric field is present across the electro-optic layer 184. Specifically, when no electric field is present, $n_d \neq n_{eo}$, and thus the diffraction layer 182 can diffract the incident image to generate multiple exit-pupil images.

Conversely, the diffraction grating 112 generates only the $0^{th}$-order exit pupil (e.g., FIG. 4), and thus is "off", when a nonzero electric field is present across the electro-optic layer 184. Specifically, when an electric field is present, $n_d=n_{eo}$ or $n_d \approx n_{eo}$, and thus the incident image does not "see" the relief pattern of the diffraction layer 182 because the layers 182 and 184 effectively combine into a single optical layer with planar sides. Therefore, the layer 182 cannot diffract the incident image into multiple exit-pupil images.

FIG. 16 is a side view of an on/off diffraction grating 112 according to another embodiment of the invention, where like numbers indicate like elements with respect to FIG. 15. The grating 112 of FIG. 16 is similar to the grating 112 of FIG. 15 except that both electrodes 180a and 180b are on one side of the diffraction layer 182. An advantage of this is that because the electrodes 180a and 180b are closer together, a smaller voltage can be applied across the electrodes to generate the desired electric field through the electro-optic layer 184. A disadvantage, however, is that because the layers 182 and 184 are not contiguous and the side 186a of the electrode 180a is not planar, the relief pattern formed in the layer 182 often should be modified to account for this. Because techniques for altering the relief pattern are known, they are omitted here for brevity.

In operation, the diffraction grating 112 of FIG. 16 operates in a manner similar to that of the diffraction grating 112 of FIG. 15.

The foregoing discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

I claim:

1. A display system, comprising:
    a beam generator operable to generate a light beam of first and second wavelengths; and
    a diffraction grating operable to receive the light beam from the beam generator and to,
        generate from the first wavelength first beamlets of at least first, second and third orders, each first beamlet having approximately a first intensity,
        simultaneously generate from the second wavelength second beamlets of at least the first, second, and third orders respectively, a second beamlet of the first order having a second intensity and the second beamlets of the second and third orders each having approximately a third intensity,
        superimpose the first beamlets of the first, second, and third orders on the second beamlets of the first, second, and third orders, respectively, to generate a resulting beamlet of the first order having a fourth intensity and resulting beamlets of the second and third orders having approximately a fifth intensity,
    wherein the fourth intensity is greater than the first and second intensities, and
    wherein the fifth intensity is greater than the first and third intensities but less than the fourth intensity.

2. The display system of claim 1 wherein:
    the resulting beamlet of the first order comprises a $0^{th}$-order beamlet; and
    the resulting beamlets of the second and third orders respectively comprise $1^{st}$- and $2^{nd}$-order beamlets.

3. The display system of claim 1 wherein the second intensity is greater than the third intensity.

4. The display system of claim 1 wherein a difference between the second and third intensities is related to a difference between the first and second wavelengths.

5. The display system of claim 1 wherein the first beamlets each have approximately the first intensity when a difference between the intensities of the first beamlet having the highest intensity and the first beamlet having the lowest intensity divided by a sum of the highest and lowest intensities equals 0.30 or less.

6. The display system of claim 1 wherein the second beamlets of the second and third orders have approximately the third intensity when a difference between the intensities of the second beamlet of the second and third orders having the highest intensity and the second beamlet of the second and third orders having the lowest intensity divided by a sum of the highest and lowest intensities equals 0.30 or less.

7. The display system of claim 1 wherein:
the first and second light beams respectively carry first and second images;
the first beamlets each carry the first image; and
the second beamlets each carry the second image.

8. The display system of claim 1 wherein:
the first beamlets of the first, second, and third orders respectively comprise a first beamlet of a $0^{th}$ order, first beamlets of a $1^{st}$ order, and first beamlets of a $2^{nd}$ order;
the second beamlets of the first, second, and third orders respectively comprise a second beamlet of the $0^{th}$ order, second beam lets of the $1^{st}$ order, and second beamlets of the $2^{nd}$ order; and
the resulting beamlets of the first, second, and third orders respectively comprise a resulting beamlet of the $0^{th}$ order formed from a superposition of the first and second beamlets of the $0^{th}$ order, resulting beamlets of the 1st order formed from a superposition of the first and second beamlets of the $1^{st}$ order, and resulting beamlets of the $2^{nd}$ order formed from the superposition of the first and second beamlets of the $2^{nd}$ order.

9. The display system of claim 1 wherein:
the first beamlets of the first, second, and third orders respectively comprise a first beamlet of the $0^{th}$ order, first beamlets of a $1^{st}$ order, and first beamlets of a $3^{nd}$ order;
the second beamlets of the first, second, and third orders respectively comprise a second beamlet of the $0^{th}$ order, second beamlets of the $1^{st}$ order, and second beamlets of the $3^{rd}$ order; and
the resulting beamlets of the first, second, and third orders respectively comprise a resulting beamlet of the $0^{th}$ order formed from a superposition of the first and second beamlets of the $0^{th}$ order, resulting beamlets of the $1^{st}$ order formed from a superposition of the first and second beamlets of the $1^{st}$ order, and resulting beamlets of the $3^{rd}$ order formed from a superposition of the first and second beamlets of the $3^{rd}$ order.

10. The display system of claim 9 wherein the second intensity of the second beamlet of the $0^{th}$ order is less than the first and third intensities of the first and second beamlets of the $1^{st}$ and $3^{rd}$ orders.

11. The display system of claim 1, further comprising a scanner operable to sweep the light beam from the beam generator onto the diffraction grating.

12. The display system of claim 1, further comprising a filter located after the diffraction grating and operable to attenuate the resulting beamlet of the first order such that after the filter the resulting beamlets of the first, second, and third orders have approximately the same intensity.

13. The display system of claim 1 wherein the resulting beamlet of the first order is located at approximately a center of a pattern formed by the resulting beamlets.

14. The display system of claim 1 wherein the second intensity is greater than the third intensity.

15. The display system of claim 1, further comprising a filter located after the diffraction grating and operable to block the resulting beamlet of the first order.

16. A display system, comprising:
a beam generator operable to generate a light beam of first and second wavelengths; and
a diffraction grating operable to receive the beam from the beam generator and to:
generate from the first wavelength a $0^{th}$-order first beamlet having a first intensity, $1^{st}$- and $2^{nd}$-order first beamlets each having approximately a second intensity that is lower than the first intensity, and higher odd- and even-order first beamlets having respective intensities that decrease from the second intensity with increasing order;
simultaneously generate from the second wavelength a $0^{th}$-order second beamlet superimposed on the $0^{th}$-order first beamlet and having a third intensity, $1^{st}$- and $2^{nd}$-order second beamlets respectively superimposed on the $1^{st}$- and $2^{nd}$-order first beamlets and each having approximately the third intensity, and higher odd- and even-order second beamlets respectively superimposed on the higher odd- and even-order first beamlets and having respective intensities that decrease from the third intensity with increasing orders;
wherein a $0^{th}$-order beamlet resulting from the superimposition of the $0^{th}$-order first and second beamlets has a fourth intensity; and
wherein $1^{st}$- and $2^{nd}$-order beamlets resulting from the superimposition of the $1^{st}$- and $2^{nd}$-order first and second beamlets each have approximate a fifth intensity that is lower than the fourth intensity and that is approximately equal to the sum of the second and third intensities.

17. A display system, comprising:
a beam generator operable to generate a light beam of first and second wavelengths;
a diffraction grating operable to receive the beam and to,
generate from the first wavelength a $0^{th}$-order first beamlet having an approximately zero intensity, $1^{st}$-order first beamlets each having approximately a first non-zero intensity, $2^{nd}$-order first beamlets each having an approximately zero intensity, and higher odd- and even-order first beamlets having respective intensities that are approximately the same as the first and approximately zero intensities, respectively, or that decrease from the first and approximately zero intensities, respectively, with increasing order, and
simultaneously generate from the second wavelength a $0^{th}$-order second beamlet having a second non-zero intensity, $1^{st}$-order second beamlets each having approximately a third non-zero intensity, $2^{nd}$-order second beamlets each having an approximately zero intensity, and higher odd- and even-order second beamlets having respective intensities that are approximately the same as the third and approximately zero intensities, respectively, or that decrease from the third and approximately zero intensities, respectively, with increasing order; and
a filter operable to block a $0^{th}$-order beamlet that results from the superimposition of the $0^{th}$-order first and second beamlets.

18. A display system, comprising:
a beam generator operable to generate a light beam of first and second wavelengths; and a diffraction grating operable to,
receive the light beam,
generate from the first wavelength a $0^{th}$-order first beamlet having an approximately zero intensity, $1^{st}$-order first beamlets each having approximately a first non-zero intensity and $2^{nd}$-order first beamlets each having an approximately zero intensity;
generate from the second wavelength a $0^{th}$-order second beamlet that is superimposed on the $0^{th}$-order first beamlet and that has a second non-zero intensity, $1^{st}$-order second beamlets respectively superimposed on the $1^{st}$-order first beamlets and each having approximately a third non-zero intensity, and $2^{nd}$-order second beamlets respectively superimposed on the $2^{nd}$-order first beamlets and each having an approximately zero intensity;
wherein a $0^{th}$-order beamlet resulting from the superimposition of the $0^{th}$-order first and second beamlets each have approximately a fifth nonzero intensity; and
wherein $1^{st}$-order beamlets resulting from the superimposition of the $1^{st}$-order first and second beamlets each have approximately a fifth nonzero intensity that is less than the fourth nonzero intensity.

19. A method, comprising:
diffracting a first wavelength of light into first beamlets each having approximately a first intensity;
simultaneously diffracting a second wavelength of light into a second beamlet having a second intensity and into third beamlets each having approximately a third intensity;
superimposing the second and third beamlets on the first beamlets to generate a first resulting beamlet having a fourth intensity and second resulting beamlets each having approximately a fifth intensity;
wherein the fourth intensity is greater than the first and second intensities; and
wherein the fifth intensity is greater than the first and third intensities and less than the fourth intensity.

20. The method of claim 19 wherein:
the first resulting beamlet comprises a $0^{th}$-order beamlet; and
the second resulting beamlets comprise a first predetermined number of orders of odd-ordered beamlets and a second predetermined number of orders of even-ordered beamlets.

21. A method, comprising:
diffracting a first wavelength of light into first beamlets each having approximately a first intensity;
simultaneously diffracting a second wavelength of light into a second beamlet having a second intensity and into third beamlets each having approximately a third intensity;
superimposing the second and third beamlets on the first beamlets to generate a first resulting beamlet having a fourth intensity and second resulting beamlets each having approximately a fifth intensity;
wherein the first resulting beamlet comprises a $0^{th}$-order beamlet;
wherein the second resulting beamlets comprise at least first and second orders of odd-ordered beamlets; and
wherein the fourth intensity is proportional to the magnitude of a difference between the first and second wavelengths and to an intensity of the second wavelength.

22. A method, comprising:
receiving a light beam including first and second wavelengths of light;
diffracting the first wavelength into a $0^{th}$-order first beamlet having a first intensity, $1^{st}$- and $2^{nd}$-order first beamlets each having approximately a second intensity that is lower than the first intensity, and higher odd- and even-order first beamlets having respective intensities that decrease from the second intensity with increasing order;
simultaneously diffracting the second wavelength into a $0^{th}$-order second beamlet having a third intensity and being superimposed on the $0^{th}$-order first beamlet, $1^{st}$- and $2^{nd}$-order second beamlets each having approximately the third intensity and being superimposed on the $1^{st}$- and $2^{nd}$-order first beamlets, and higher odd- and even-order second beamlets having respective intensities that decrease from the third intensity with increasing order and being superimposed on the higher odd- and even-order first beamlets;
wherein a $0^{th}$-order beamlet resulting from the superimposition of the $0^{th}$-order first and second beamlets has a fourth intensity; and
wherein $1^{st}$- and $2^{nd}$-order beamlets resulting from the superimposition of the $1^{st}$- and $2^{nd}$-order first and second beamlets each have approximately a fifth intensity that is lower than the fourth intensity and that is a approximately equal to the sum of the second and third intensities.

23. A method, comprising:
receiving a light beam including first and second wavelengths of light;
diffracting the first wavelength into a $0^{th}$-order first beamlet having a first intensity, $1^{st}$-order first beamlets each having approximately a second intensity that is lower than the first intensity, $2^{nd}$-order first beamlets each having an approximately zero intensity, and higher odd- and even-order first beamlets having respective intensities that are approximately the same as the second and approximately zero intensities, respectively, or that decrease from the second and approximately zero intensities, respectively, with increasing order; and
diffracting the second wavelength into a $0^{th}$-order second beamlet having a third intensity and being superimposed on the $0^{th}$-order first beamlet to form a $0^{th}$-order resulting beamlet having a fourth intensity, $1^{st}$-order second beamlets each having approximately the third intensity and being superimposed on the $1^{st}$-order first beamlets to form $1^{st}$-order resulting beamlets each having a fifth intensity, and $2^{nd}$-order second beamlets each having approximately a sixth intensity that is lower than the fifth intensity and being superimposed on the $2^{nd}$-order first beamlets to form $2^{nd}$-order resulting beamlets each having approximately the sixth intensity, and higher odd- and even-order second beamlets having respective intensities that are approximately the same as or that decrease from the fifth and sixth intensities, respectively, with increasing order and being superimposed on the higher odd- and even-order first beamlets; and
generating a beamlet pattern by blocking the $0^{th}$-order resulting beamlet.

* * * * *

UNITED STATES PATENT AND TRADEMARK OFFICE
CERTIFICATE OF CORRECTION

PATENT NO.         : 7,133,204 B2
APPLICATION NO. : 10/890501
DATED              : November 7, 2006
INVENTOR(S)        : Urey Hakan It is certified that error appears in the above-identified patent and that said Letters Patent is hereby corrected as shown below:

Column 17 line 23 replace "beam lets" with --beamlets--
Column 17 line 36 replace "3nd" with --3$^{rd}$--
Column 18 line 26 replace "orders" with --order--
Column 19 line 19 replace "each have approxmiately a fifth" with --has a fourth--

Signed and Sealed this

Tenth Day of April, 2007

JON W. DUDAS
*Director of the United States Patent and Trademark Office*